United States Patent [19]
Collins et al.

[11] Patent Number: 5,583,978
[45] Date of Patent: Dec. 10, 1996

[54] APPARATUSES AND METHODS FOR CREATING AND USING PORTABLE FONTED TEXTS WITH EMBEDDED AUTOMATICALLY-CREATED FONT DESCRIPTIONS

[75] Inventors: John S. Collins, Boston; Mark H. Goldwater, Norfolk, both of Mass.

[73] Assignee: Bitstream Inc., Cambridge, Mass.

[21] Appl. No.: 250,372

[22] Filed: May 27, 1994

[51] Int. Cl.$^6$ .................................................. G06T 5/00
[52] U.S. Cl. ................................................................. 395/170
[58] Field of Search ........................................ 395/151, 150, 395/155, 161, 141, 113, 115, 116, 110, 112; 382/198, 204, 242, 259

[56] References Cited

U.S. PATENT DOCUMENTS

| | | | |
|---|---|---|---|
| 4,785,391 | 11/1988 | Apley et al. | 395/150 |
| 5,099,435 | 3/1992 | Collins et al. | 395/150 |
| 5,167,016 | 11/1992 | Bagley et al. | 395/144 |
| 5,301,267 | 4/1994 | Hassett et al. | 395/150 |
| 5,309,554 | 5/1994 | Ito | 395/150 |
| 5,355,449 | 10/1994 | Lung et al. | 395/150 |
| 5,473,709 | 12/1995 | Aoki | 382/258 |

FOREIGN PATENT DOCUMENTS

| | | |
|---|---|---|
| 0480399A2 | 4/1992 | European Pat. Off. . |
| 0534622A2 | 3/1993 | European Pat. Off. . |
| 0583548A1 | 2/1994 | European Pat. Off. . |

OTHER PUBLICATIONS

*Microsoft Windows Device Driver Adaptation Guide*, © 1987–1992 by Microsoft Corporation, front cover, title page, copyright page, and pp. 122 and 123.

*Microsoft Windows Printers and Font Kit*, © 1987–1992 by Microsoft Corporation, front cover, title page, copyright page, table of contents, and pp. 86 and 87.

Postscript Language by Adobe Systems, Incorp. Seventh Printing, Aug. 1987.

*Electronic Documents: A White Paper*, © 1993 by No Hands Software, 1301 Shoreway Road, Suite 220 Belmont, CA 94002.

*The Dawn of Easy Electronic Documents?*, © 1993 by Info World Publishing Company, vol. 9, Issue 14, pp. 4–8.

*Fonts and Output Issues*, The Seybold Report of Desktop Publishing, Apr. 8, 1991, pp. 27–30.

*Tools Review on Common Ground, Adobe Acrobat Exchange and Adobe Acrobat Starter Kit*, Publish magazine, Feb. 1994.

*Portable Documents*, Infoworld, Jan. 17, 1994, pp. 66–67 and 71–77.

(List continued on next page.)

Primary Examiner—Almis R. Jankus
Attorney, Agent, or Firm—Edward W. Porter

[57] ABSTRACT

A computerized system inputs fonted text and outputs corresponding fonted text containing new, automatically created, font descriptions. The new font descriptions make the output a portable document which can be rendered at any magnification by a machine of any output resolution, even if that machine does do not have access to the pre-defined font descriptions associated with the original input text. The system creates the portable document by accessing the pre-defined font descriptions of each character-font shape in the input text and generating new font descriptions which describe those shapes in a new font description language. Preferably the system findspoints on the outlines of each character-font shape which are a function of the shape itself, rather than how its pre-defined description describes that shape. The system bases the segmentation of the new font description on such description-independent points. Once created, the portable document can be rendered on the computer or printer generating it or a computer or printer receiving the document over a network or on mass storage media. In some embodiments, the computer viewing the portable document determines whether can access and render the pre-defined font description of each character in the portable document. If so, it does so. If not, it interprets the shape of the character from its new font description in the portable document.

24 Claims, 14 Drawing Sheets

OTHER PUBLICATIONS i Adobe™Acrobat™Products & Technology, An Overview, by Adobe Systems Incorporated, 1585 Chareston Road, Mountain View, CA 94039, Nov. 1992.

Fontographer produce brochure, from Altsys Corporation, 269 Renner Road, Richardson, TX 75080.

Produce review of Fontographer, MacUser magazine, Oct. 1992, p. 56.

Produce review of FontStudio, MacUser magazine, May 1992, starting at page 56.

Produce review of FontStudio, MacUser magazine, Sep. 1990, pp. 76 and 80.

*Adobe Type I Font Format*, publised by Adobe Systems Incorporated, 1990.

*Ditital Formats for Typefaces*, by Peter Karow, Published by URW Verlag, Hamburg, Germany, 1987, Title page, Copyright Notice Page, Table of Contents, and pp. 116–117 and pp. 376–377.

*Character Generation Under Grid Constraints*, by Roger Hersh, Computer Graphics, vol. 21, No. 4, Jul. 1987, pp. 243–252.

Affidavit of John Collins concerning Fontographer and FontStudio programs, dated May 24, 1995.

*TrueType Font Embedding DLL Specification*, Mar. 29, 1995, Version 0.912, published by Microsoft Corporation.

*LaserJet Unlimited, Edition II*, by Nace and Gardner, published by Peachpit Press 1988, pp. 263–268 and 445.

"Adobe Acrobat In Use" by Brailsford from *desktop Publishing Commentary*, Aug. 1993, UK. vol. 9, No. 4, ISSN 0957-3178, pp. 9–13.

"ElseWare technology promise more efficient font portability" by Mark Moore, *PC Week*, vol. 10, No. 17, May 3, 1993.

300 — -Search physical font list for a physical font record with the specified fontID
306 — -If the specified string fontID is not found
308 — -create a new physical font record with that fontID and add it to physical font list
310 — -call GetFontInfo() to get information from the font interpreter about the physical font
312 — -call GetCharID(), and then ExecChar(), for each of the characters used for hinting, and derive hinting values for the physical font from them
314 — -Make the matching or newly created physical font the current physical font
316 — -Search the logical font list associated with current physical font for a logical font with attribute values matching those of FontAttributes
320 — -If a complete attribute match is not found, create a new logical font record with a new logical font code having those attributes, and add it to the current physical font's logical font list
322 — -Make the matching or newly created logical font record the currently active logical font
324 — -return its logical font number as the fontCode

FIG. 7

328 —Search the current physical font's character tree for a character record with matching specified charCode
334 —If the charCode is found, exit CsrDoChar
336 —If the charCode is not found
   338 —create a new character record with the charCode and place it in the character tree
   340 —initialize character shape processing
   342 —call ExecChar for that character
   344 —until ExecChar returns
      346 —when the funtion called by ExecChar is CsrMoveTo
         348 —if there is a contour open
            352 —complete and close the contour
            354 —insert the contour into the contour tree
         350 —open a contour, with the start position indicated by the CsrMoveTo
      358 —when the function called by ExecChar is CsrLineTo, CsrCubicTo, or CsrQuadraticTo
         360 —if no contour is open, exit reporting an error
         362 —store points associated with each successive outline segment described by CsrLineTo,CsrQuadraticTo, or CsrCubicTo in Character Shape Array
         364 —for each curve received, if it has any inflection or XY extreme (i.e., horizontal or vertical tangent) points, mark them as such, and if any of those marked points do not occur at an end of the received curve, divide the received curve into sub-curves at the marked point, and replaced the received curve with the two sub-curves in the character shape array
         366 —for each on-outline point received for which two adjacent outline segments have been received, detect if it is a corner or tangent, and if so mark it as such, and update the contourBBox if it is an X or Y max or min, and the actual contour direction if it is an X maximum
         368 —for the outline segement between each pair of successive marked points in the character shape array
            420 —approximate it with a line or cubic bezier curve
            422 —if it is approximated with a curve, calculate curve depth
            424 —put points representing the approxmated segment into the open contour
            426 —if any of the newly approximated segment's corresponding points in the character shape array are not part of a line segment adjacent to an as-yet unapproximated segment, delete them from the character shape array
460 —save location in open contour as escapement value for character
462 —flatten the contour tree to two levels to separate glyph elements
464 —for each glyph element...
   466 —standardize contour direction
   468 —standardize contour start point
   470 —build edge and stroke lists
   472 —generate glyph record and string
   474 —search glyph record tree for a glype record with a matching signature
   476 —for each match found
      488 —compare its glyph program strings (GPS)with that of current char
      490 —if they match, mark the match for the current char
   478 —if no GPS match is found for the new glyph record, insert it into the glyph record tree
480 —write the char's gps in order indicated by the character's contour tree, a using Compound GPS if it has more than one glyph or if any of its glyphs match a previously recorded GPS
496 —update font bounding box

FIG. 9

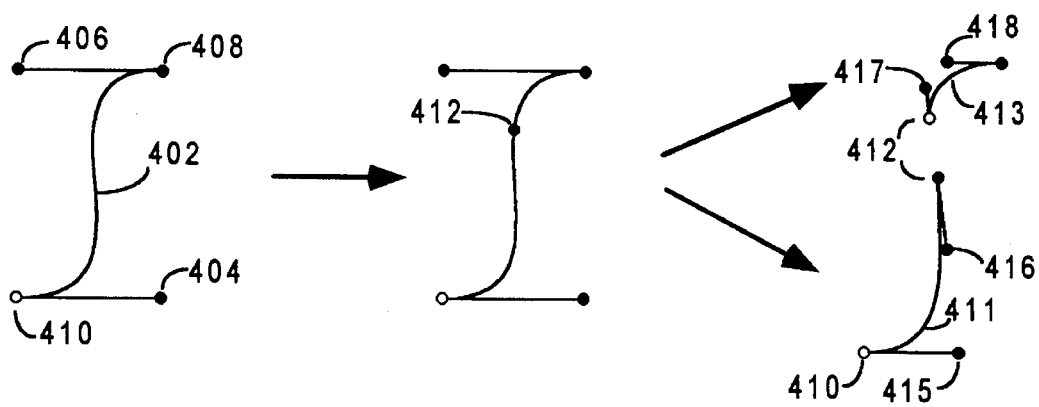

FIG. 11

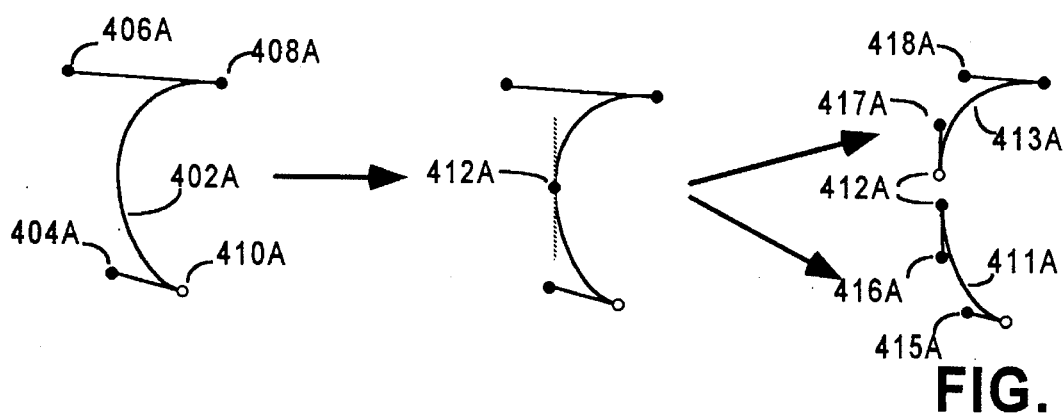

FIG. 12

370 — -find the left-most and right-most vectors (1L and 1R, respectively) from the point preceding the point being tested and a 2 ORU square centered around the point being tested 372 — -find the left-most and right-most vectors (2L and 2R, respectively) from the point being tested to a 2 ORU square centered around the following point 373 — -if both 2L and 2R are left of 1L and 1R, label the tested point as a definite left corner 374 — -else if both 2L and 2R are right of 1L and 1R, label the tested point as a definite right corner 375 — -else if 2L is to the right of 1R and 2R is to the left of 1L, label the tested point as a corner of indeterminate direction 376 — -else label the tested point as not being a corner

FIG. 13

430 — -if the distance from a vector between the entire curve's endpoints to the furthest of its control points is less than 1/2 ORU, return with a MaxDepth of 0

432 — -call the RecursiveSubdivision subroutine for the entire curve with a depth of 1

434 — -if one end of deepestSubCurve is one end of entire curve, call the RecursiveSubdivisioin subroutine for the half of the entire curve which contains the opposite end of that curve with a depth of 2

436 — -return with MaxDepth

FIG. 17

-RecursiveSubdivision (p1stEnd, p1stControlPoint, p2ndControlPoint, p2ndEnd, pdepth)

440 — -if depth > maxDepth, set maxDepth = depth

442 — -divide the curve bounded by 1stEnd and 2ndEnd into two sub-curves at a midPoint 444 — -measure the greatest deviation between the control points of each sub-curve and a vector between the endpoints of that sub-curve 446 — -if the greatest deviation for both sub-curves is less than 1/2 ORU, store 1stEnd and 2ndEnd in deepestSubCurve and return 448 — -otherwise call the RecursiveSubdivision subroutine for the subcurve with the greatest deviation

FIG. 18

126 — -PFR Structure
  500 — -logical font directory
  502 — -first logical font record
      -FontAttributeValues
      -physicalFontOffset
      -physicalFontSize
      -...

502 — -...

-physical font record
    504 — -font resolution and size
      -font hinting information
      -...
      -character record
    510 — -glyphProgramStringOffset
      -glyphProgramStringSize
    510 — -...
  504 — -...
  506 — -...
  506 — -simple glyph program string
  508 — -...
  508 — -compond glyph program string
      -...

FIG. 20

APPARATUSES AND METHODS FOR CREATING AND USING PORTABLE FONTED TEXTS WITH EMBEDDED AUTOMATICALLY-CREATED FONT DESCRIPTIONS

FIELD OF THE INVENTION

The present invention relates to computer font technology, that is, the computer technology of representing and generating the shapes of alphanumeric characters and other images used with text.

BACKGROUND OF THE INVENTION

Since the beginning of the written word, creators of documents have been concerned not only with how their words would sound to the ear if spoken, but also with how they appear to the eye when read. Before the advent of print, calligraphy was a major art form. With print, the art of creating and using fonts has superseded calligraphy in importance.

A font is a set of shapes representing each character in an alphanumeric character set. Usually the shapes of different characters in each font share certain characteristics, such as horizontal and vertical position of certain shape features, the general width of their vertical and horizontal strokes, and whether or not they are serifed, bold, or italic, so that the characters of a given font look appropriate together.

Commonly a font is identified by a basic font name, such as "Courier", "Arial", "Helvetica", or "Times New Roman" which identifies the general shapes of its characters, independent of size. These basic font names are often trademarks owned by the designers of the font. The basic font name is often followed by a point size designation which specifies the size of that font. Sometimes other words are inserted between the basic font name and the point size, such as "bold", which means its strokes are to be thicker; "narrow", which means its entire characters are to be made more narrow; "italic", which means its characters are to be slanted; or "oblique", which is used for sans serifed characters and means its characters are to be slanted.

The ability to vary fonts has many advantages. It lets a user vary the size of his letters to pack text more densely when necessary and to allow text to be more easily read. Using different fonts also has the ability to visually distinguish different parts of the text. This makes texts easier to scan and use. In addition, some texts are more visually pleasing than others, whereas some are easier to read. Different fonts appeal to different aesthetic senses. Some appear traditional, some modern, some art nouveau, some art deco, some hand written, some humorous, and some shocking. The ability to select from a wide variety of fonts greatly increases the ability to tune the aesthetic message of a document.

When the computer age started, most computers only represented text in one font. In the last decade or so, however, an increasing percentage of computer systems have the ability to display and print text in several different fonts. Most such computers have font resources which contain pre-defined font descriptions for the shape of each character of each of the fonts it can handle. The pre-defined font descriptions describe character shapes in a specified form or language.

Some font languages represent shapes as bitmap images which can be translated directly to the pixels on a video display or a laser printer. This has the advantage of being fast, but it has the disadvantage of requiring a different set of font descriptions for each different size.

More recently there has been a trend to scalable font languages. These languages define character shapes in terms of the one or more outlines which define its shape. Each such outline is defined by a move to a starting location and then a sequence of outline segments, each of which is either a line or a curve, such as a Quadratic or Cubic Bezier curve or a circular arc, followed by a move to the standard position for starting the next letter. A Bezier curve is a well-known type of curve defined by its two on-curve endpoints and one or two off-curve control points located between them. Quadratic Bezier curves only have one off-curve control point, with the curve at each endpoint being tangent to a line from that endpoint to the control point and with the angle of the curve reflecting the angle formed by those tangent lines. Cubic Bezier curves have two off-curve control points, with the curve at each endpoint being tangent to the line to its closest control point and with the curve's extent in the general direction of each such tangent near an endpoint being a function of the length from that endpoint to the tangent's associated control point. The lines and segments are usually defined in a resolution of either 1000×1000 or 2048×2048 units, called outline resolution units, or ORUs. Since these font descriptions define a shape in terms of lines and curves and since that definition is made with a high resolution, they can be used to generate font images of virtually any desired size.

In scalable font technology the set of font descriptions defining the outline shapes of each character in a character set can be considered a base, or physical, font. The variously sized fonts generated from such a physical font are considered logical fonts, because they do not have separate shape descriptions associated with their characters, but rather generate such shapes at the specified size from the scalable physical font description. Using such nomenclature, there would be, for example, physical font associated with the base font name "Arial", and that physical font would have associated with it any logical font which had the name "Arial" followed by a point size specification, such as "Arial 12" or "Arial 24". Normally a separate physical font is provided for font names which include "Bold", "Italic", or "Narrow", but fonts with the word "Oblique" in their name are often generated by slanting the shapes of the corresponding physical font, and the same could be done, if necessary for "Italic" if no corresponding italic physical or base font is provided.

There are currently several major scalable font languages. They include PostScript, developed by Adobe Systems Incorporated, of 1585 Charleston Road, Mountain View, Calif. 94039, TrueType, developed by Apple Computer, Inc., 20525 Mariani Avenue, Cupertino, Calif. 95014; Speedo, developed by Bitstream Inc., the assignee of this application; and Intellifont, developed by the AGFA division of Miles Inc, 90 Industrial Way, Wilmington, Mass. 01887. Each of these languages uses a different code or format to describe shapes and represents shapes in different ways. For example, TrueType uses quadratic Bezier curves to define the shape of curve segments, whereas PostScript and Speedo use Cubic Bezier curves, and Intellifont use circular arcs.

For a computer to render a font named in a given document, it requires not only a bitmapped or scalable font description of that font's characters, but also software, called a font interpreter, that knows how to interpret the particular code in which each font language's font descriptions are written and convert them into a bitmap pattern or a sequence of moves and outline segments.

Unfortunately, not all computers have the same font descriptions or the ability to interpret the same font languages. This creates a problem if an electronic document is created on a first computer using one or more given fonts and is then transferred to second computer which does not have those fonts or which cannot interpret them. In such a case, when the document is shown or printed on the second computer it has different fonts than intended. This can cause the document to have a very different, and often undesired appearance, and can disrupt its spacing and pagination. In highly formatted text, such a text with columns, this can make the text almost unreadable. In addition, some fonts have special characters not found in other fonts, or use different character codes than are commonly used in other fonts so that such a font mismatch can not only disrupt the appearance and organization of a document, but can also cause information to be lost or be garbled.

One solution to the problem of making fonted text portable is to send a copy of all fonts and font interpreters needed to properly render the characters of a document along with it. Unfortunately this has many problems. First, finding out what fonts and interpreters need to be sent with each such document and installing them on the viewing machine would be labor intensive. Furthermore, it would present legal problems because, even though the actual shape of fonts have long been held not to be copyrightable, both the code and sequence of outline segments contained in font descriptions have been considered by many to be copyrightable, and thus cannot be installed in a new machine without legal permission.

There have been multiple prior attempts to deal with this problem.

A first prior approach is to use software that enables the computer playing back a document to attempt to approximate a font called for in the document with a font which is similar, if it has one. Such systems attempt to replace one serifed font with another, one italic with another, and so on. Unfortunately, this approach still requires that the computer playing back a document have fonts which approximate those it is to replace, and the approximations are often disappointing.

Another prior technique amplifies this first approach by using software that sends information along with documents explaining the size of each character in each of the fonts used. This enables corresponding software in the playing computer to stretch or compress whatever font it is using to approximate a missing font to produce a font which has the same spacing. This provides the valuable advantage of preventing the formatting of documents from being upset due to spacing differences, but is still is only an approximation.

Another prior approach has been to embed, or include, font descriptions with the document so the party at the other end can use them. The makers of such embeddable fonts have designed them so they can only be used in the document in which they have been included and thus have granted a license for such a copy of their font descriptions to be made without requiring express permission. Unfortunately, all such systems of which we are aware only work with fonts of one language and assume that the computer on which their documents are to be played has interpreters for that language. Thus the documents produced cannot be properly reproduced if the machine playing them back does not have the proper font interpreter and it even if does, it can only provide insured portability for fonts written in that interpreter's one language.

Another prior approach is to have a document recorder application which records bitmap images of all character-font shapes included in a document from the font interpreter of the computer creating the document and embeds them in a copy of the document. The resulting portable document is designed to be viewed or printed from a player application on another computer. The player renders the shape of each character in the document from its associated embedded font. The program has the ability to, in effect, creates bitmapped physical and logical fonts. That is, if the user decides he or she does not want to have to store separate bitmap images for the same shape font in different sizes, the system will store it in one size and on playback attempt to generate bitmap patterns at different sizes from it.

This approach appears to avoid copyright problems, because it has long been held that the shape of fonts is not copyrightable and the bitmap patterns copied are determined largely by the shape of the font's original pre-defined font descriptions rather than from the actual code or sequence of moves and outline segments used in that description. It also has that advantage of being able to play back any font handled by the computer creating the document. It has the disadvantages of requiring a large amount of memory to produce a large variety of fonts accurately.

SUMMARY OF THE INVENTION

It is an object of the present invention to provide an apparatus and method for creating and playing back portable documents, that is documents in which text with a variety of different fonts can be accurately played back by a machine which does not previously have font descriptions and font interpreters for all of that document's fonts.

It is yet another object of the present invention to provide such an apparatus and method which creates and plays back such portable documents automatically.

It is still another object of the present invention to provide such an apparatus and method which creates and plays back such documents quickly.

It is yet another object of the present invention to provide such an apparatus and method which creates such documents with portable font description which do not require much storage space.

It is still another object of the present invention to provide an apparatus and methods for automatically creating new font descriptions of character shapes defined in old font descriptions while avoiding copying certain features in such old font descriptions which are not required to describe those shapes.

According to one aspect of the invention, a computerized apparatus and methods for character shape recording are provided. The character shape recording develops new font descriptions from shapes received from a pre-defined descriptions. It does so by modeling each such shape to find points on its outlines which are a function of that shape itself, rather than the particular manner in which the pre-defined description defined that shape. Such description-independent points can include corner points with angles so large they could not be caused by rounding errors, inflection points, tangent points, and X or Y extreme points. The system bases the segmentation of the new font description it creates on such description-independent points.

Preferably the character shape recording finds new line or curve segments to approximate the segments from the pre-defined font description between such description-independent points. Preferably, it also picks the outline order, starting point for the description of each such outline, and the direction of that description according to standard rules, independently of the ordering, starting point, or direction of those outlines in the pre-defined description. This causes the new font descriptions to be free of non-shape-required aspects of the pre-defined descriptions, and it causes such descriptions to be highly uniform and, thus, easier to play back.

It is also preferred that the system finds the "depth" of each curve segment in the new font description. This indicates how finely the curve must be subdivided on playback so it can be accurately portrayed by vectors spanning each such subdivision. This depth is calculated by recursively subdividing the curve into subdivisions, approximating each subdivision by a vector, and recursing on the worst fitted subdivision until the worst fit is acceptable. The level of the deepest recursion indicates the curve's depth.

Preferably the system can generate new font descriptions from shapes defined in any one of a plurality of fonts and font description languages, including scalable and bitmap descriptions. If it receives pre-defined font descriptions from different fonts, it groups the new font descriptions into groupings corresponding to the those of the pre-defined font descriptions.

It is preferred that the system match outline shapes for different characters of the same or different fonts, and save storage space by recording a single description of any shape used in more than one new font description.

It is also preferred that the system generate new font descriptions from non-character shapes, such as logos and other images which can be used with text.

According to another aspect of the invention, computerized apparatus and methods use character shape recording, such as that described above, to create portable documents. This portable document creating system receives a fonted input text, accesses and interprets the pre-defined font descriptions associated with each character-font combination in the input text, and generates a new font description for the shape description interpreted for each character-font combination. Each such new font description describes its shape as a sequence of outline segments according to a new font description language. The system creates a portable document, or output text, which includes the sequence of characters in the input text, the new font descriptions for those characters; and an indication of which of new font description represents the shape of each such character.

Preferably the system also includes a capability to render an image of the portable document's fonted text, such as on a computer screen or printer. This capability can be located either in the computer which created the portable document, or in another one. When it is located in another computer, a capability is provided for communicating the portable document between computers, such as by removable storage medium or electronic network.

According to another aspect of the invention, a product is created by recording a portable document of the type described above on a mass storage medium According to yet another aspect of the invention apparatus and methods provide enable the fonted text of portable documents, such as those described above, to be viewed or rendered. Such a viewer identifies the named font associated with each successive character in the portable document, and determines whether or not the system can render it from one of its original pre-defined font descriptions. If it determines it can, it does so. If it cannot, it interprets the new font description for that character included in the portable document.

DESCRIPTION OF THE DRAWINGS

These and other aspects of the present invention will become more evident upon reading the following description of the preferred embodiment in conjunction with the accompanying drawings, in which:

FIG. 7 is a more detailed flow chart of the functional steps performed by the CsrSetFontSpecs() function shown in the character shape recorder in FIGS. 4 and 6;

FIG. 9 is a more detailed flow chart of the functional steps performed by the CsrDoChar() function which is part of the character shape recorder in FIGS. 4 and 6;

FIGS. 11 and 12 are a diagramatic representations of how step 364 of FIG. 9 divides curve segments received by the character shape array at inflection and X extreme points, respectively;

FIG. 13 is a more detailed description of the corner detection functionality described in step 366 of FIG. 9;

FIGS. 17 and 18 are more detailed flow charts of the steps used to perform the curve depth analysis of step 422 of FIG. 9;

FIG. 20 is a schematic representation of the data element contained in the portable font resource shown in FIGS. 1, 6, and 21;

DETAILED DESCRIPTION OF PREFERRED EMBODIMENTS

Figure 1:
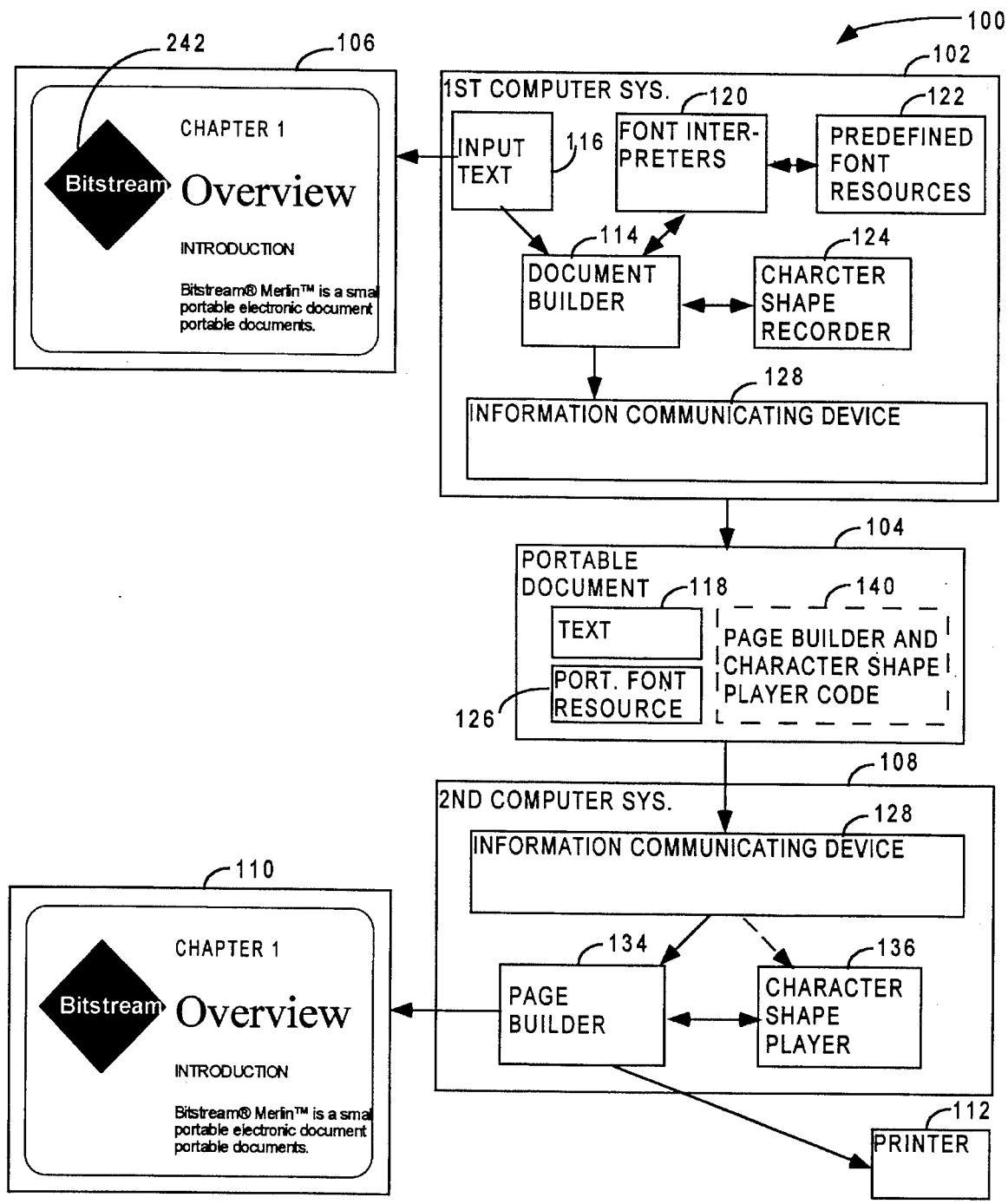
FIG. 1 is a high level block diagram of one embodiment of the invention in which a first computer converts an input text written using a plurality of pre-defined font descriptions into a portable document having new font descriptions and in which a second computer receives the portable document and renders an image of it using the new font descriptions it contains.

FIG. 1 provides an overview of a system 100 for creating and playing back portable fonted documents. This system includes a first computer 102 in which the portable document 104 can be created, and its accompanying video monitor 106. It also includes a second computer system 108 in which the portable document can be played back, and its accompanying video monitor 110 and printer 112.

The computers 102 and 108 are preferably computers, such as personal computers or computer workstations, which include memory devices for storing program instructions and data structures and one or more processing element for executing such instructions and manipulating such data structures. As the computer's one or more processors execute such instructions, it forms the functional element described for each of these computers.

The first computer 102 includes a document builder 114. This document builder has means for receiving a fonted input text 116. Such a text can be received from an external source, such as a disk or data network, or it can be created in a program running on the first computer, such as a word processor or desktop publishing program. The input text is comprised of a sequence of font names, text characters, and positioning codes. Normally each text character is associated with the first font name to precede it in the sequence, and each such font name has associated with it a set of coded pre-defined font descriptions in the computer's font resource 122 describing the shape of each character in that font.

The document builder places codes corresponding to each of the input text's successive font names, text characters, and position codes into the text 118 of the portable document 104. In addition, for each unique combination of a character and font name in the input text, the document builder creates a new font description for the shape described in its corresponding pre-defined font description.

It does this by causing the first computer's font interpreter 120 to interpret the character-font shape's pre-defined font description in the computer's font resource 122. The font interpreter translates the coded pre-defined font description into a sequence of moves, lines, and curves which define the outline of the character-font shape. It provides these to the document builder. The document builder, in turn, supplies this interpreted shape description to the first computer's character shape recorder ("CSR") 124. The CSR includes the capability to model the shape contained in the interpreted description, and to produce a new font description which is virtually independent of any aspects of the interpreted font description which are not required by the shape it represents. The CSK returns this new font description to the document builder, which then places it in the portable document's portable font resource 126, indexed by the codes used to represent its associated font and character in the portable document's text 118.

Figure 2:
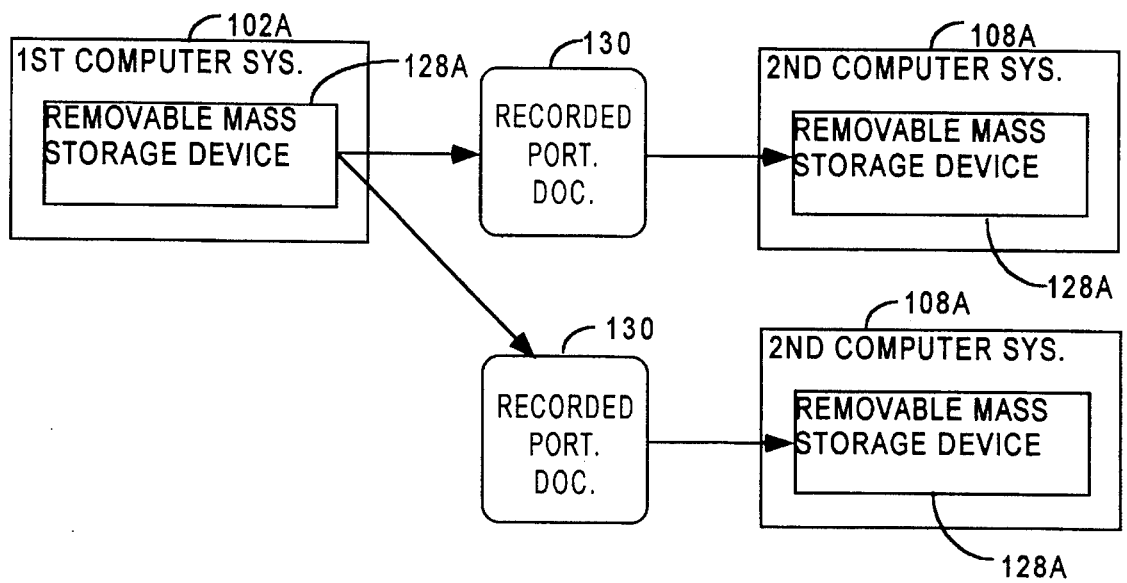
FIG. 2 is a high level block diagram of a version of the embodiment show in FIG. 1 in which the portable document is communicated between first and second computers on a removable mass storage medium.
Figure 3:
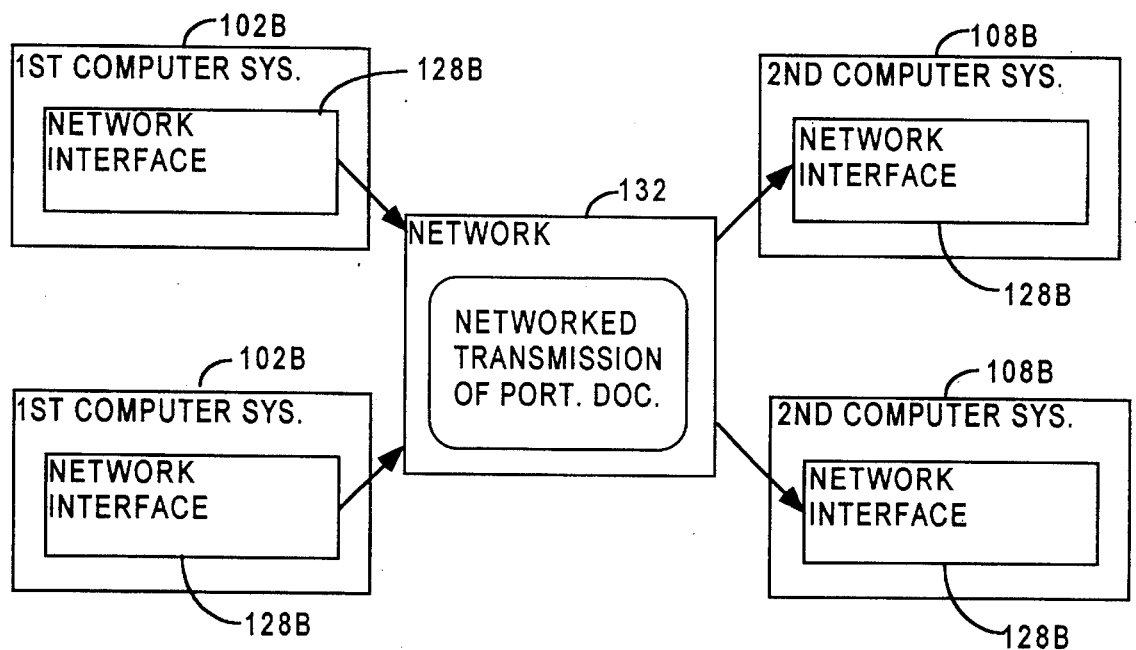
FIG. 3 is a high level block diagram of a version of the embodiment shown in FIG. 1 in which the portable document is communicated between first and second computers over an electronic data network.

Both the first computer 102 and the second computer 108 include a device for communicating information between them. As is indicated in FIG. 2, this device can be a device 128A for communicating the portable font resource from the first to the second computer on a removable mass storage medium 130, such as a magnetic or optical disk, CD, or tape. The removable medium 130 can include singly produced copies, or mass produced copies. As is indicated in FIG. 3 it can also be a network interface 128B which can communicate the portable document over a network 132. The network 132 can include LANs, WANs, telecom connections, on-line services, the internet, and, in the future, the so-called information highway.

The second computer 108 also includes a page builder 134 and a character shape player ("CSP") 136. The page builder creates a rendered image, such as a page image or a screen image from the portable document. It reads the successive font, character, and position codes from the text 118 of the portable document 104. It uses the font codes to determine the font associated with each character. It uses the position codes to position the characters in the rendered image. In response to each character code, it asks the CSP to generate the shape for that character given its associated font code. The CSP generates this shape from the new font description indexed under that character and font in the Portable Font Resource 126. It delivers this shape to the page builder which places it at the proper location in the rendered image, and which then sends that rendered image either to an output device, such as the video monitor 110 or the printer 112.

Thus, it can be seen that the embodiment of the invention shown in FIG. 1 allows a fonted document created with the font interpreters and pre-defined font resources of the first computer, such as that shown in the first computer's display 106, to be communicated to, and visually rendered with virtually the exact same appearance by a second computer which does not have those font interpreters and font resources. And it does so without copying the copyrightable shape-independent aspects of the first computer's pre-defined font descriptions.

Since the character shape recorder 124 of the first computer can create a new font description for any shape described to it as a sequence of moves, lines, and quadratic and cubic Bezier curves, it can create new font descriptions from any font description language which the first computer's font interpreter can interpret into such a sequence of move, lines, and curves. Since all the major font description languages have associated font interpreters which can provide such output, or output which can be easily convened into such a form, this means the invention can be used with all such font description languages, even if they occur in the same document.

In some alternate embodiments of the invention the document builder includes means for placing representations of bitmap fonts in the portable font resource 126. This includes means for recording the bitmap pattern received from the font interpreter 120 for small fonts directly as the font descriptions for such images in the portable font resource. The document builder in such embodiments also includes means, used when larger bitmaps are received, for performing edge detection on the bitmap pattern, creating a move instruction to a first point on each edge in the pattern, and a line corresponding to the distance between each successive point on that edge, and supplying that sequence of moves and line segment to the character shape recording process described above. With these features, it can be seen that the invention enables virtually any document created with virtually any font to be accurately reproduced on another computer which does not contain the original font descriptions from which it was created.

The basic concept disclosed in FIG. 1 has many applications. In some, the document builder 114 and character shape recorder 124 are built directly into a user application, such as a word processor, draw program, or desktop publisher. In others, it is built into the operating system. In others still it is placed in a driver module which is interfaced to as a printer driver, so that it can interface to virtually any major application designed to run on its associated computer platform.

Similarly, in some applications the page builder 134 and character shape player 136 are built into a much larger user application. In others, it is part of special portable document viewer application. And in others still, it is built into the operating system.

The nature of the portable document varies with use of the document builder 114, recorder 124, page builder 134, and character shape player 136. For example, in many systems in which these modules are all built into a much larger user application, the portable document is a normal file for that application. In systems in which the document builder and recorder are in a print driver module and the page builder and player are part of a document viewer program, the portable font document cannot normally be read by the application which originally created its fonted text. In systems in which the document builder, recorder, page builder, and player are incorporated into the operating system, any file produced by any application compatible with that operating system can be a portable document 104.

In some embodiments, a single computer includes both the document builder and recorder, as well as the page builder and player, so that computer can both send and receive portable documents.

In some embodiments the portable document includes the page builder and player code so, a computer reading the portable document can view the portable documents text and fonts without having to previously have a copy of the page builder and recorder.

Figure 4:
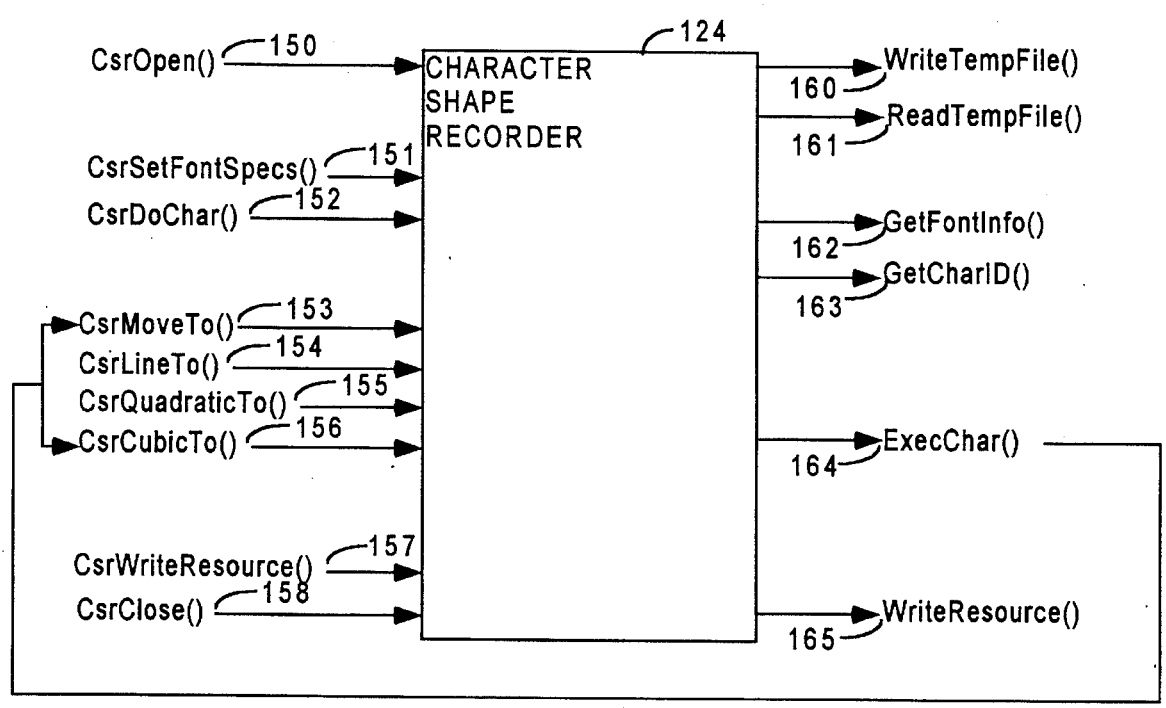
FIG. 4 is a diagram of the functional interface of a character shape recorder software module designed according to the present invention for a plurality of uses, including use as the character shape recorder of the first computer in FIG. 1.
Figure 5:
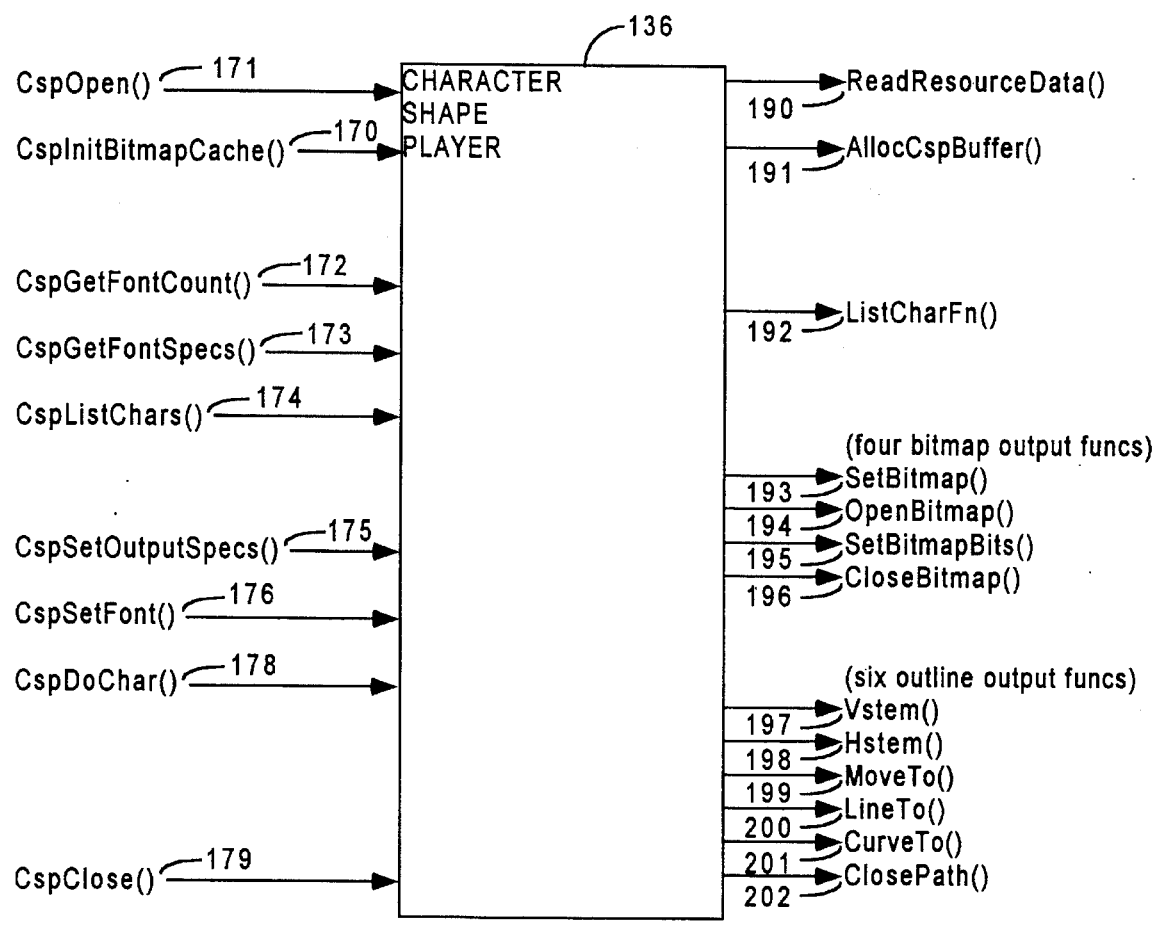
FIG. 5 is a diagram of the functional interface of a character shape player software module designed according to the present invention for a plurality of uses, including use as the character shape player of the second computer shown in FIG. 1.

FIGS. 4 and 5 show a preferred embodiment of the character shape recorder 124 and character shape player 136, respectively. In this embodiment, both the recorder and player 136 have been designed as discrete software modules. They have been modularized so their code can be used in a plurality of different software applications, different computers, and different operating systems. They have been written in the commonly used C programming language which is supported on almost all major computer systems. They do not include any functions which are operating system dependent. And they do not include much functionality that is likely to vary from application to application.

In some embodiments, for example, the recorder and the player are part of a software application that run on Unix, IBM PC compatible, and Apple Macintosh computers. In each machine dependent version of this application they are surrounded with code which interfaces with the operating system, performs the functions of the document and page builders, and creates portable documents which can be read by the corresponding versions of the application on the other types of computers. This enables fonted portable documents created on one type of computer to be played back with virtually the exact same appearance on another types of computer.

The modularization of the recorder's and the player's functionality also allows them to be used for purposes different than that described in FIG. 1. For example, in one embodiment of the invention the recorder is used as part of a program which creates sets of new font descriptions from sets of pre-defined font descriptions, independently of any input text. Once created, such new fonts can then be used with any application containing a player module.

In FIGS. 4 and 5 the function calls which can be made by host software using each module are shown on the left. These are the functions 150–158 in FIG. 4 and 170–178 in FIG. 5. In these figures, the function calls made by the module back to its host software are shown on the right. These so-called "callback" functions are numbered 160–165 in FIG. 4 and 190–202 in FIG. 5. The code of the functions on the left in each figure is part the recorder or player module. The code of the callback functions on the right is included in the host software which uses such modules.

In FIG. 4, the functions CsrMoveTo(), CsrLineTo(), CsrQuadraticTo(), and CsrCubicTo(), are pointed to by a line from the callback function ExecChar() because these functions are called by ExecChar() to deliver the moves, lines, and curves which define a character's shape to the recorder.

Figure 6:
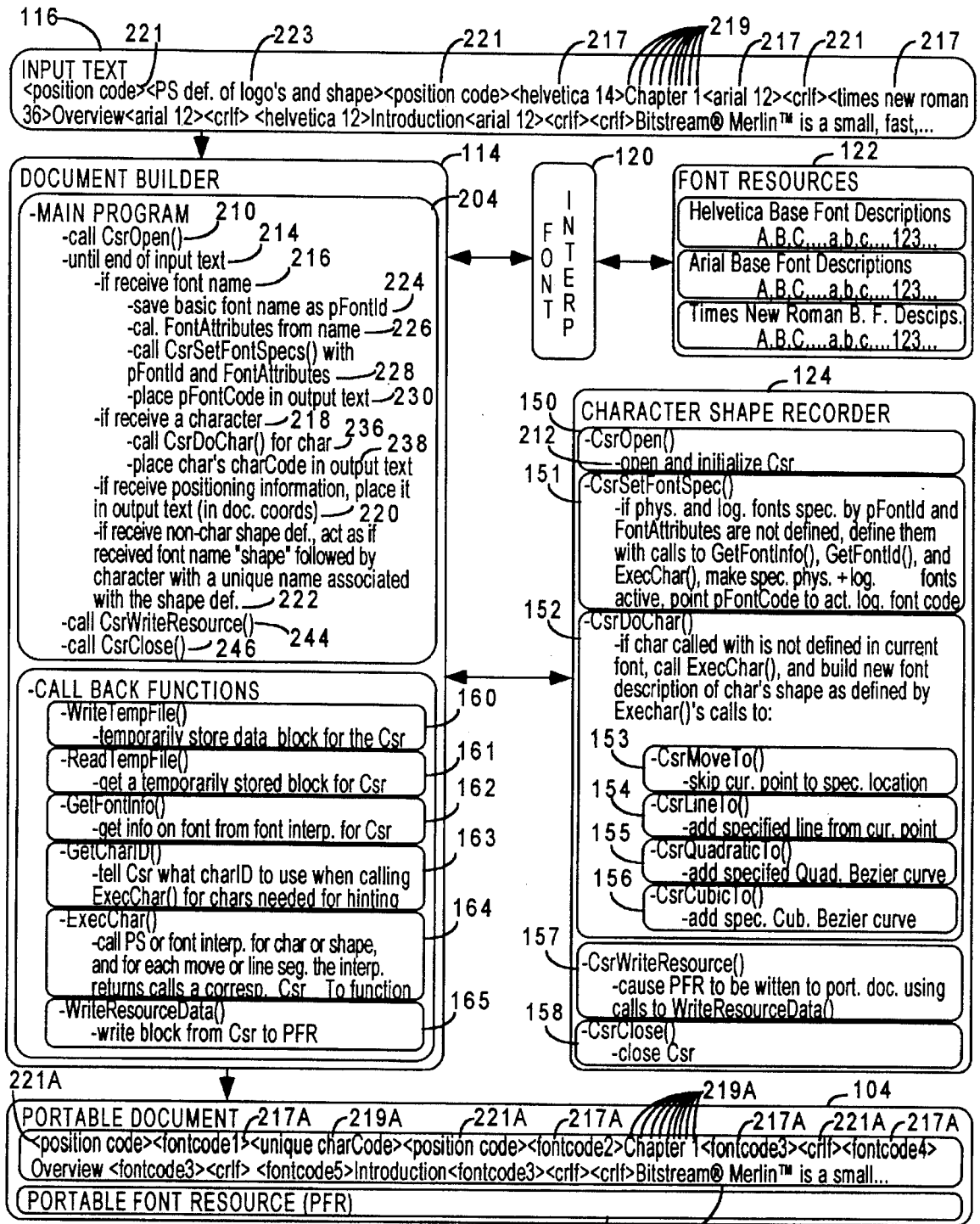
FIG. 6 is a more detailed schematic diagram of the functional elements of the first computer shown in FIG. 1, in which the character shape recorder of FIG. 4 is used, including the major functional steps performed by the document builder and character shape player.

FIG. 6 provides a more detailed schematic view of the functional elements shown in the first computer 102 in FIG. 1. It shows how the document builder 114 interacts as the host program for the modular character shape recorder 124 to convert the input text 116, which uses pre-defined font descriptions, into the portable document 14.

The document builder includes a main program 204 and the callback functions 160–165 shown on the right-hand side of FIG. 4.

The first step shown for the document builder's main program is step 210. This calls the CSR's CsrOpen() function 150. In step 212, CsrOpen() opens and initializes the player software module 124, giving it the memory buffer and temporary files it needs to work and setting up its initial data structures.

Once this function returns, the document builder's next step 214 performs a loop until it has processed all the codes in the input text 116. For each successive code received from the input text this loop performs the steps 216, 218, 220, and 222 shown indented under it.

Step 216 tests to see if the received code is a font name, such as the codes 217 shown in the input text. If so, its substeps 224, 226, 228, and 230 are performed. Step 224 saves the basic font name portion from the full font name received and points pFontId to it. Step 226 calculates the fonts attributes, such as its size, whether or not it is obliqued, and whether it is a solid or outlined font, from the full font name received and stores it in a data structure called FontAttributes. Then step 228 calls the CSR function CsrSetFontSpecs() 151 with pFontId and FontAttributes.

FIG. 7 provides a more detailed description of CsrSetFontSpecs() operation. In step 300, it searches the linked list of physical font records 302 shown at the top of FIG. 8, known as the physical font list, for a physical font record with a pFontID value 304 pointing to the same physical font name as the pFontID with which CsrSetFontSpecs() has been called. If such a match is not fond, meaning the CSR has no record for the specified physical font, step 306 creates such a physical font record by performing steps 308, 310, and 312. Step 308 actually creates a new physical font record data structure 302, having the specified pFontID value, and places it at the end of the physical font list. Step 310 calls the host document builder's GetFontInfo() callback function 162 shown in FIG. 6, to get information from the font interpreter about the physical font and it places this information in the new physical font record. This includes the ORU resolution in which the font interpreter defines the moves, lines, and curves of that physical font's shapes. It also includes the name of the physical font. Step 312 calls the document builder's GetCharID() and ExecChar() functions for each of a small sub-set of alphanumeric characters used in a process known as "hinting". For each such character, first it calls GetCharID(), which returns the character code used to identify that character in the first computer's font interpreter, and then it calls ExecChar() with the character code GetCharID() returns for that character, to get the character's shape.

This is done to get a measure of the standard horizontal and vertical positions, and standard thickness associated with certain character features in the physical font. These hinting value are recorded in the physical font record, and are ultimately stored with the physical font in the portable document. This is done so they can be used by the character shape player to shift the position of important edges of a character's outlines when the character is rendered, so as to produce more attractive images, given the granularity of the pixel pattern used. Hinting is well known in computer font technologies. The important thing here is to note is that the hinting information recorded in the portable document 104 is derived not from hinting information contained in the pre-defined font descriptions in the first computer's font resources, but rather from the actual positions and sizes of character features in the font.

ExecChar() 164 is an important callback function used by both CsrSetFontSpecs() and CsrDoChar(). It is called by CSR functions with the name the font interpreter uses for a given character, which is normally the code for that character in the input text. It responds by calling the first computer's font interpreter 120 for that character in the current font indicated by pFontID and FontAttributes. If the font is a scalable font, ExecChar() responds to each move, line, quadratic Bezier curve, or cubic Bezier curve received from the font interpreter, respectively by calling CsrMoveTo(), CsrLineTo(), CsrQuadraticTo(), or CsrCubicTo() to deliver the definition of that move or outline segment to the CSR. In some document builders, if the font interpreter returns a bitmap pattern, ExecChar() responds by performing edge detection on the bitmap, and then describes each edge detected to the CSR with an initial move to one of its points, followed by the sequence of lines between each successive point on that edge.

Whether or not the physical font record matching the specified pFontID previously existed or was just created by steps 308, 310, and 312, step 314 makes that physical font records the currently active physical font.

Then step 316 searches the linked list of logical font records 318 associated with the currently active physical font record 302 for a logical font record having FontAttribute values 319 matching those with which CsrSetFontSpecs() was called. These values include the fontMatrix, which defines how the physical font is to be scaled and slanted (if at all) to produce a character shape defined in document coordinates. It also includes information about whether or not the character shape is to be rendered in solid or outline form, and if in outline form, how thick the outlines should be and how they should join at angles. If such a prior logical font record having the specified FontAttributes is not found, step 320 creates a new logical font records at the end of the logical font list hanging from the current physical font record and records the specified FontAttribute values 319 in it. Then step 322 makes the previously existing or newly created logical font with matching FontAttributes the CSR's currently active logical font, and step 324 returns to the document builder with a code which uniquely identifies the currently active logical font pointed to by pFontCode.

After CsrSetFontSpecs() returns to the document builder, step 230 places the FontCode 217A pointed to by pFontCode into the sequence of codes in the text 118 of the portable document. Once this is done the program advances to the top of loop 214 to process the next code received from the input text.

If the code received from the input text is a code 219 representing a character, the test in step 218 will be met and steps 236 and 238 will be performed.

Step 236 calls the CSR's CsrDoChar() function 152 for the character. This function, which is shown in more detail in FIG. 9, is one of the most important pans of the CSR, because it actually performs the character-font shape recording process. Its first step, step 328, searches the binary tree of character records 330, shown in FIG. 8, which is hung off the currently active physical font record 302 for a character record having a charCode 332 matching that for which CsrDoChar() has been called. The tree is a binary tree, a well known type of data structure, because each of its character record can point to two child character records, one through a pNextUp pointer 340 and one through a pNextDown-pointer 342. Records are added to the tree such that all records descending from a given record which have a charCode less than that of the given record descend from the given record's pNextDown pointer and all records descending from it which have a higher charCode descend from pNextUp. This enables the tree to be rapidly searched, by following pNextDown or pNextUp, respectively, at each record if the specified charCode is less or greater than the charCode at that record. This process is followed until either a record which matches the specified charCode is found or a pNextDown or pNextUp with a zero pointer is found, meaning such a matching character record does not exist in the tree If such a matching charCode is found in one of the current physical font's associated character records, a previous call to CsrDoChar() has already recorded the shape of the current character in the current font, and thus CsrDoChar() has nothing further to do. In this case step 334 returns to the document builder. If such a match is not found, step 336 causes the rest of the steps shown in FIG. 9 to perform character shape recording.

The first step in the character shape recording, step 338, creates a new character record data structure 330 and inserts it into the binary tree at the appropriate location, given its charCode. If pRootCharacter has a zero value, the tree is empty indicating this is the first character being processed for the current physical font. In this case the new character record is inserted as the root of the tree and pRootCharacter is pointed to it. If the tree isn't empty, the new character record is inserted at the point at which the above described search of the tree encountered a zero pNextDown or pNextUp pointer, and that pointer is pointed to the new record. The system checks to see if the tree is unbalanced, with many more records depending from one side of some of its records than from the other. If so it is rearranged to balance it so that the tree has as few levels as possible, and thus can be searched most rapidly.

Figure 10:
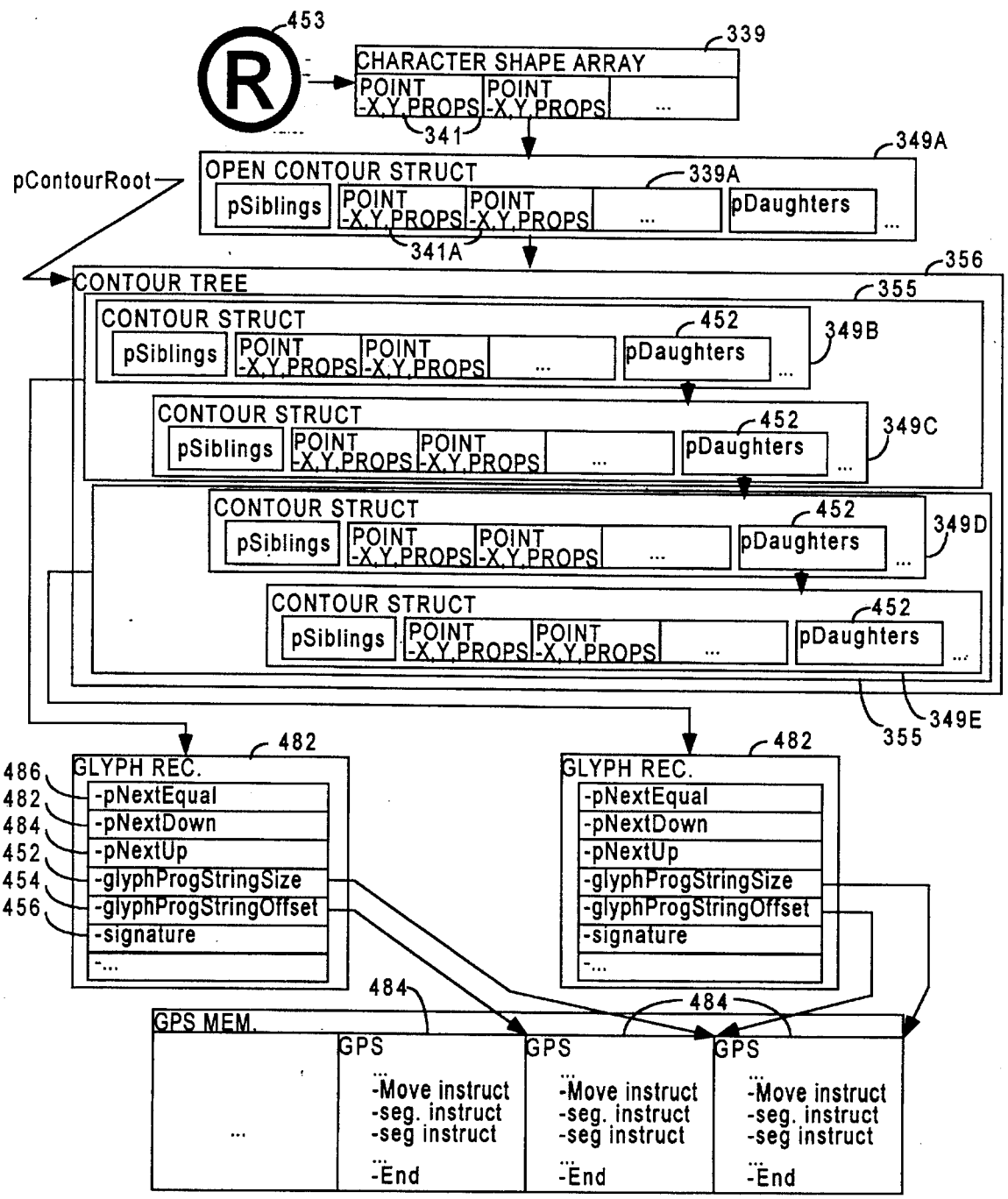
FIG. 10 is a schematic diagram of the following data structures created by the character shape recorder of FIGS. 4 and 6: the character shape array, the open contour structure, the hierarchical contour tree into which contour are placed once closed, the division of that tree's contour structures into glyph elements, the glyph records created in association with each such glyph element, and the glyph program strings ("GPSs") which contain new shape descriptions derived from the contours of each such glyph element.

Once step 338 has inserted the character record for the character being processed into the character tree, step 340 initializes character shape processing by setting up its associated initial data structures, including the beginning of the character shape array 339 shown in FIG. 10. The character array 339 stores, in a succession of point structs 341, the points which describe the outline segments received from the document builder's ExecChar() function 164. Then step 342 calls the document builder's ExecChar() function 164 for the character, which responds by calling the CSR's CsrMoveTo(), CsrLineTo(), CsrQuadraticTo(), and CsrCubicTo() functions 153, 154, 155, and 156 shown in FIG. 6, for each move, line, quadratic Bezier curve, and cubic Bezier curve, respectively, supplied to ExecChar() from the first computer's font interpreter. Once ExecChar() has been called, CsrDoChar() waits for ExecChar() to return, and during this wait the CSR performs initial character shape recording through the operation of the Csr_To() functions 153–156 which ExecChar() calls. For simplicity, in FIG. 9 and the description of it that follows that wait and the steps performed by the Csr_To() functions will be represented by the until loop 344 and the steps indented under it, as if they were part of the CsrDoChar() function.

When the function called by ExecChar() is CsrMoveTo(), step 346 causes steps 348 and 350 to be performed. Step 348 tests to see if there is already an open contour structure 349A, as shown in FIG. 9, and if so it performs steps 352 and 354. The open contour structure 349A is used to receive information, including outline segments, derived from the shape of the current outline being processed in the current character-font combination for which CsrDoChar() has been called. If there is such a previously open contour, the CsrMoveTo() call indicates a move away from the outline it represents to the start of a new outline. In this case, step 352 finalizes the information in the previously open contour 349A and closes it. Then step 352 places that closed contour 349 into the contour tree 356, a hierarchical tree of such closed contour structures also shown in FIG. 10. Whether or not there was a previously open contour when the call to CsrMoveTo() was made, by the time step 350 is reached there is not, and that step opens a new contour with its first point being that determined by the displacement indicated by CsrMoveTo().

When ExecChar() calls CsrLineTo(), CsrQuadraticTo(), or CsrCubicTo(), step 358 causes the steps 360, 362, 364, 366, and 368 indented under it in FIG. 9 to be executed.

Step 360 exits with an error if no contour is open, as you might expect, because CsrLineTo(), CsrQuadraticTo(), and CsrCubicTo() all defined a line segment relative to a previously defined point in the current contour, and if there is no such contour open, the system would not know how to interpret them.

Step 362 stores the points associated with each successive outline segment by the Csr_To()function. Each call by ExecChar() to CsrLineTo() adds one point to the array, the on-outline endpoint of a line from the previous point in the array. Each call to CsrQuadraticTo() adds two points to the array, first an off-outline control point of a quadratic Bezier curve which starts with the previous point in the array, followed by the on-outline endpoint of that curve. And each call to CsrCubicTo() adds three points to the array, the two off-outline control points of a cubic Bezier curve which starts with the previous point in the array, followed by the on-outline endpoint of that curve.

Step 364 differentiates each curved segment received by a call to CsrQuadraticTo() or CsrCubicTo() to see if that curve contains an inflection point or an XY extreme point(actually a point having a horizontal or vertical tangent). If it finds any such points it marks them as such in the character shape array, or if such points are other than on an endpoint already in the character shape array, it subdivides the curve at such a marked point, and replaces the set of points representing the undivided curve with a set of points representing each of the curves resulting from the subdivisioin.

FIG. 11 shows a cubic Bezier curve 402 having an inflection point in its middle. This curve is originally represented by three points received from CsrCubicTo(), first control point 404, a second control point 406, and an endpoint 408. The curve is also defined by the previous point 410 in the character shape array. Step 364 would detect that this curve has an inflection point 412. Since this point is not one of the curve's two endpoints 408 or 410, it subdivides the curves at the inflection point 412 into two new curves 411 and 413, each with two control points 415 and 416, and 417 and 418, respectively. The curve 411 has the inflection point 412 as its endpoint. The curve 413 has the endpoint 408 of the original curve as its endpoint. The points 415, 416, 412, 417, and 418 are inserted into the character shape array in place of the original curve's two control points 404 and 406. FIG. 12 shows a cubic Bezier curve 402A which is likewise split into two new curves at a horizontal tangent point.

Step 366 checks to see if there are any on-outline points in the character shape array which have line or curve segments defined on both sides of them in the array, and, if so, for each such point it checks to see if that point should be marked as a corner or tangent. Tangents are selected simply by picking points which are not labeled as a corner and which are between a curve segment and a line segment, where the line segment is of sufficient length that it is unlikely a single cubic Bezier curve could approximate the shape of both of them. Each such point is also compared with the maximum and minimum values for both the X and Y coordinates stored in the contours ContourBBox, and if it has a coordinate greater or lesser than any such maximum or minimum respectively, that maximum or minimum is updated to equal the coordinate. If the point is an X maximum, the direction of the angle formed at it, either clockwise or counterclockwise, as determined by the process of FIG. 13, is recorded as the contour's actual direction.

FIG. 13 illustrates the process used to pick points which should be marked as corners and to associate a direction with such corners, if possible. This process is performed to insure that apparent corners which could have resulted from the outline resolution unit ("ORU") quantization in shape descriptions received by the CSR are not labeled as corner points. It comprises the steps 370–376.

Figure 14A:
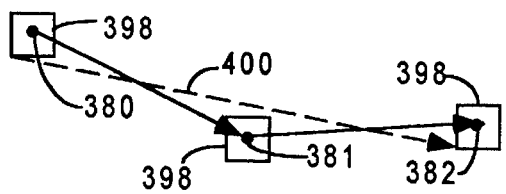
FIGS. 14A–D, 15A–C, and 16A–C are diagrams used to illustrate the corner detection steps of FIG. 13.
Figure 14B:
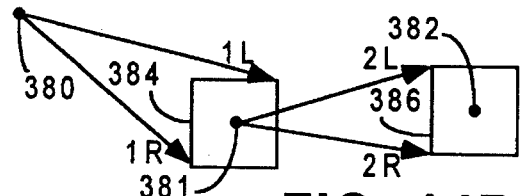
Figure 14C:
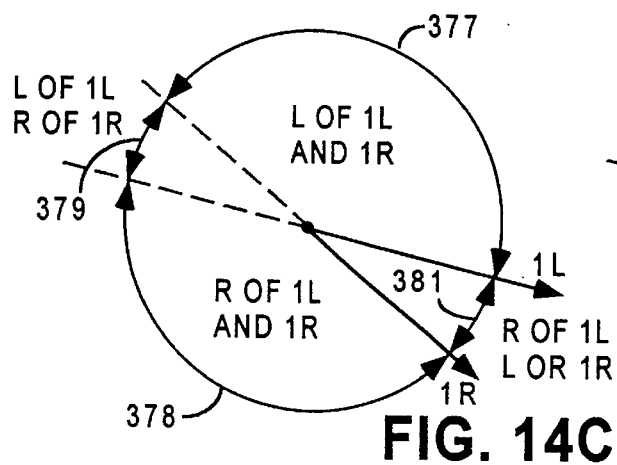

Step 370 finds the left-most and the right-most vectors 1L and 1R, respectively, shown in FIG. 14B from the point 380 preceding the point 381 being tested in the character shape array to a square 384. This square is two outline resolution units (ORUs) on a side, and it is centered around the tested point 381. "Left" and "right" are defined relative to the direction in which outline segments have been received in the character shape array. Step 372 finds the left-most and right-most vectors 2L and 2R, respectively, from the point 381 being tested to a similar two ORU square 386 centered around the point 382 which follows the tested point in the character shape array.

The vectors 1L and 1R represent the range of possible directions for the vector from point 380 to point 381, given the possible quantization error in the location of each such point. Similarly, the vectors 2L and 2R represent the range of possible directions for the vector from point 381 to point 382, given the possible error in those points.

Where the segment before or after the tested point 381 is a curve, the point 380 or 382, respectively, will be an off-curve control point. This is not a problem, however, since the line from the endpoint of a quadratic or cubic Bezier curve to its nearest control point is the tangent of that curve at its endpoint, and, thus a line from the endpoint to that control point reflects the angle made with the adjacent outline segment at that endpoint.

Once steps 370 and 371 have calculated the vectors 1L, 1R, 2L, and 2R, steps 373, 374, 375, and 376 perform a series of tests to see how the tested point 381 should be labeled. Step 373 tests to see if the vectors 2L and 2R each form left angles greater than zero and less than one hundred and eighty degrees with both 1L and 1R. In the example of FIGS. 14, this means it tests to see if both vectors 2L and 2R fall within the angular range 377 shown in FIG. 14C. If this test is met, it means all possible vectors between points 381 and 382, given the possible quantization error, form a left angle with all possible vectors between points 380 and 381, given that possible error, and, thus, step 373 labels the tested point 381 as a definite left corner.

If the test of step 373 is not met, step 374 tests to see if the vectors 2L and 2R each form right angles greater than zero and less than one hundred and eighty degrees with both 1L and 1R. In the example of FIGS. 14, this means it tests to see if both vectors 2L and 2K fall within the angular range 378 shown in FIG. 14C. If the test of step 374 is met, it means that all possible vectors between points 381 and 382, given the possible quantization error, form a right angle with all possible vectors between points 380 and 381, given that possible error, and thus, it labels the tested point as a definite right angle.

If neither the tests in step 373 and 374 are met, step 375 tests to see if 2L forms a right angle which is greater than zero degrees and no greater than one hundred and eighty degree with 1R and it tests to see if 2R forms a left angle greater than zero degrees and no greater than one hundred and eighty degrees with 1L. In the example of FIGS. 14, this means it tests to see that no portion of the range of possible directions between 2L and 2R falls within the range of possible directions 381, shown in FIG. 14C, between 1L and 1R. If the conditions of step 375 are met, it means that none of the possible vectors between point 381 and 382, could form a straight line with any of the possible vectors between points 380 and 382, given that possible quantization error, and so step 375 labels the point as a definite corner. But it marks the point as a corner of either left or right angle, because neither the tests of steps 373 and 374 have been met.

If none of the tests in steps 373, 374, and 375 have been met, step 376 marks the point as not being a corner.

Figure 14D:
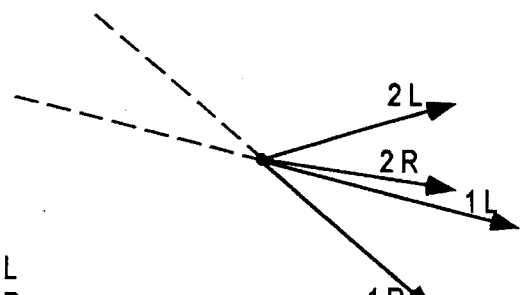

The application of these tests to the set of points shown in FIGS. 14A and 14B is shown in FIG. 14D. In this figure it can be seen that range of possible vectors between 2L and 2R falls into the portion 377 of the arc which is clearly to the left of the range of possible vectors between 1L and 2R. Thus, the test of step 373 is met and the tested point is labeled as a definite left turn, one which has too sharp an angle to have resulted from ORU quantization. This is indicated in FIG. 14A, because even if the X and Y value of each point 380, 381, and 382 were allowed to vary in either direction by the maximum ORU rounding error of one half ORU, as indicated by the one ORU squares 398 centered around those points, it would be impossible to draw a straight line 400, shown as a dotted line in the figures, through those points.

Figure 15A:
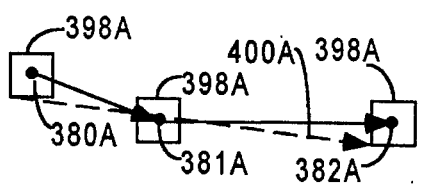
Figure 15B:
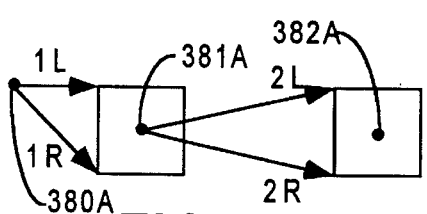
Figure 15C:
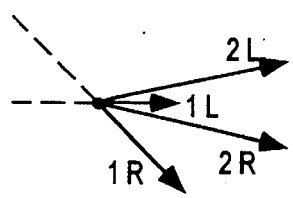

In the case shown in FIG. 15A–C, the apparent left angle between the points 380A, 381A, and 382A is sufficiently slight, given the distance between them, that a line 400 could be drawn which touches all three squares 398A, indicating that the apparent angle between the points could have been created by ORU rounding errors. As is indicated in FIGS. 15C, none of the tests of steps 373, 374, and 375 will be met because the range of possible vector directions between 2L and 2R does not lie entirely to the left, entirely to the right, or entirely out of the range of possible vector directions between 1L and 1R. This being the case, step 376 labels the tested point as a non-corner.

Figure 16A:
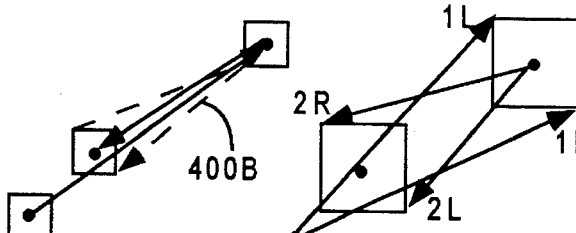
Figure 16B:
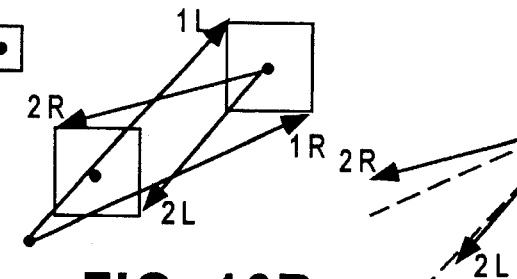
Figure 16C:
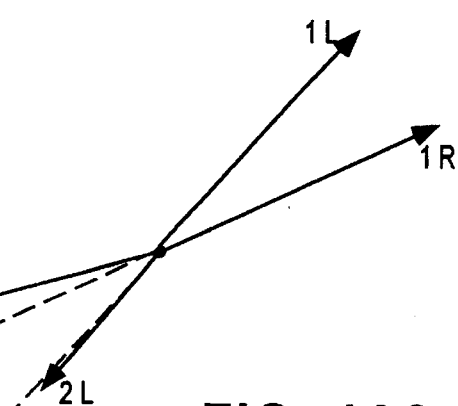

In the case shown in FIG. 16A–C, the apparent left angle is sufficiently sharp that it is clearly a corner, but the quantization error is large enough that it could actually be a right turn, as indicated by the dotted angled line 400B, rather than a left turn. In this case, as is indicated in FIG. 16C, the range of possible vector directions between 2L and 2R is neither entirely to the left of, or entirely to the right of, the range of possible directions indicated by 1L and 1R, and thus the tests of steps 373 and 374 will not be met. But that range of possible directions indicated by 2L and 2R is entirely outside of the range of possible directions indicated by 1L and 1R, and, thus, the test of step 375 is met and the tested point is labeled as a corner of either left or right direction. This being the case, the character shape recorder will use the point as a marked point for segmentation purposes in step 368 of FIG. 9, but it will not use the corner for a calculations of contour direction in step 366 of that figure if that corner is an X maximum. Instead it will leave the last definite direction, if any, associated with a corner which was at the time of its processing an X maximum as the actual direction of the contour.

Once steps 364 and 366 have been performed, step 368 performs steps 420, 422, 424, and 426 for the portion of the outline segment in the character shape array located between successive pairs of points which have been marked as inflections, XY extremes, corners, or tangents by steps 364 and 366.

Step 420 approximates any such portion of the outline, which may cover one or more segments in the character shape array, with a line or cubic Bezier curve. If the outline portion between the two marked points is a simple line or cubic Bezier curve, then that line or Bezier curve is used as the approximation. Otherwise, line or curve fitting techniques are used to find the approximation.

If the outline portion is approximated with a curve, step 422 calculates the "depth" of the approximating curve. That is, it calculates the number of times the curve has to be recursively sub-divided in two, before the worst error between such a subdivision and the vector between its endpoints would be less than one half ORU. This value is used by the character shape player when it reads the character shape from the portable font resource so it knows how finely it has to subdivide each curve to accurately render it with vector approximations.

FIG. 17 shows the steps of the main program which performs this depth analysis, and FIG. 18 shows the steps of the recursive subroutine which actually performs the recursive subdivision. The main program has four major steps 430, 432, 434, and 436.

Step 430 checks if the distance between the vector spanning the curve's endpoints and each of the curve's control points is less than one half ORU. If so, it returns with a depth of 0, since the curve does not need to be subdivided at all to be approximated within the limits of the rounding error by a vector between its endpoints. The distance between the vector and the curve's control points is used because, by the nature of cubic Bezier curves, such a vector can never have a greater distance to any point on its associated cubic Bezier curve than its greatest distance to one of that curve's control points, and because it is mathematically much simpler to find the maximum distance from the vector to the two control points than it is to find the maximum distance from the vector to the curve.

If the test of step 430 is not met, step 432 calls the RecursiveSubdivision subroutine of FIG. 18. As shown in FIG. 18, this subroutine is called with pointers to the 1stEnd, 1stControlPoint, 2ndControlPoint, and 2ndEnd of the cubic Bezier curve it is to subdivide. It is also called with the depth of is recursion. The subroutine comprises steps 440, 442, 444, 446, and 448.

Step 440 tests to see if the value of depth with which the subroutine is called is greater than the current value of maxDepth, the maximum depth reached so far by any recursion performed on the entire curve. If so it sets the value of maxDepth equal to the recursion's depth. Then step 442 finds the midpoint of the Bezier curve with which the recursion has been called and divides that curve into two new two Bezier curves at that midpoint. Then step 444 finds which of the new sub-curves has the greatest distance from a vector between its endpoints and one of its two control points. Once this has been done, step 446 tests to see if this greatest distance is less than one halfORU. If so, step 446 stores 1stEnd and 2ndEnd in a structure called deepestSubCurve, so the routine shown in FIG. 17 will be able to tell where the curve with the deepest recursion ended, and it returns to that routine. If not, step 448 calls the RecursiveSubdivision subroutine for the newly formed sub-curve with the greatest distance between a vector spanning its endpoints and one of its two control points.

As those skilled in computer programming will appreciate, this RecursiveSubroutine will keep dividing a given Bezier curve in half, picking the worst fitted half, and then dividing that in half in half until the worst fitted half is fitted to within one half ORU. At that point maxDepth will hold the level of the deepest recursion and deepestSubCurve will hold the endpoints of the deepest sub-curve. Then the deepest recursion will return to the recursion that called it, and that recursion will return to the recursion that called it, and so on, until the initial calls to RecursiveSubroutine returns to step 432 of FIG. 17.

At this point step 434 tests to see if one of the endpoints of the deepest sub-curve stored in deepestSubCurve is one of the end points of the entire curve for which the depth calculation is being made. If so, it calls the RecursiveSubdivision subroutine again, this time for the half of the entire curve which contains the opposite end of the entire curve from that containing the deepest sub-curve found by the prior recursion. This is done because the deviation between the subdivisions of a given cubic Bezier curve and vector approximations to those subdivision will either have one local maximum, which is the global maximum for the entire curve, somewhere between the curve's two endpoints, or two local maximum located at each of the curve's two endpoints, one of which might require deeper recursion than the other. In the first case, the recursion of the first call to the RecursiveSubroutine in step 432 are guaranteed to catch the maximum deviation for the entire curve. But in the second case, the half of the entire curve which has the greatest deviation at the first level of recursion might not be the one having the end with the deepest local maximum, and, thus, the recursions of step 432 might not find the curves true maximum depth. Step 434 causes the recursion to be performed for the other half of the entire curve in this second case to ensure that the depth of both ends of the entire curve will be found, so that maxDepth will contain that deepest depth.

The depth finding algorithm shown in FIGS. 17 and 18 significantly speeds the operation of the character shape recording because it only pursues recursion on the half of each sub-curve which is worst fitted by a vector, thus preventing the amount of computation required for the depth analysis from going up exponentially with the depth of the curve.

Returning now to FIG. 9, after step 422 has been completed, step 424 inserts the approximated segment calculated by step 420 into the point array 339A of the open contour struct 349A shown in FIG. 10. It can be seen that the segmentation of the outline segments represented by points on curve and control points in the contour's point array are dependent on the horizontal and vertical tangents, inflection points, filtered corners, and boundaries between curves and significant lines found in the shape defined by the outline segments received from ExecChar() calls to the CSR, rather than by the actual segmentation of those received outline segments.

Once newly approximated outline segments have been placed into the open contour 349A, step 426 deletes from the character shape array all points which are not part of a segment which has not yet been approximated or which are not needed to process such an unapproximated segement. It does this to conserve memory, since such points have no further use.

Either step 346 or 358 and its respective sub-steps are repeated for each of ExecChar()'s calls to the CSR during the processing of a given character-font shape.

Each subsequent time a call to CsrMoveTo() is received from ExecChar(), it indicates the end of the description of one contour, or outline, in the shape being described by ExecChar() and either the beginning of another such contour or, if there are no more such contours, the move to the starting position for the next character which marks the completion of that shape's description by ExecChar(). In either case, when such a subsequent call to CsrMoveTo() is received, step 352 completes and closes the open contour 349A and step 354 places in its proper place into the contour tree.

Step 354 places it into the hierarchical contour tree 356 as follows:

If the contour tree is empty, it points a global variable pContourRoot to the new contour. If the contour tree is not empty, scan the list of contours at the top level. For each scanned contour, if the new one encloses it, remove the scanned contour from the list and add it to the new contour's daughter list, pointed to by pDaugther 452. If the new contour is enclosed by the scanned contour, restart the scanning process with the scanned contour's daughters. When the end of the list being scanned is reached, add the new contour to the list. The actual contour insertion process maintains a consistent order for sibling lists to ensure that the glyph matching, described below, is reliable. The order is based on the value of xmin in the contour's bounding box, ContourBBox. In the event of a tie, the order ymin, xmax, or ymax is used until a difference is found. There should be no case of distinct sibling contours that have identical bounding boxes.

In the example shown in FIG. 10, the contour 349B associated with the outside outline of the circle in the registered trademark symbol 453, will ultimately be placed at the first, or highest, level of the contour tree because it enclose all that symbol's other contours. The contour 349C, associated with inside outline of that circle, will be a 2nd level contour. The contour 349D, associated with the outside outline of the "R" in the registered trademark symbol, will be a 3rd level contour. And the contour 349E, associated with the inside outline of the "R" will be a fourth level contour. It should be understood that some characters will have multiple contours at one level. For example, the shape "½" will have three contours all at the first level, whereas the shape "B" will have one contour at the first level and two depending from it at that second.

Once ExecChar() returns to CsrDoChar() at step 460 shown in FIG. 9, each outline of the character-font shape should be recorded in a closed contour structure 349, and each of those structures should be organized into a hierarchy indicating which encloses which. At this point an open contour exists which was created by step 350 by the last CsrMoveTo() called by ExecChar(), that associated with the character-font shape's escapement. Step 460 saves the location of the initial point in this open contour to calculate the escapement value for the shape being recorded and closes the open contour.

Then step 462 splits the contour tree 356 into two level sub-trees. That is, it groups each odd level contour and its zero or more daughter contours into a sub-tree 355. For example, in FIG. 10, the first level contour 349B, which represents the outside outline of the circle of the "®" symbol, and the contour 349C, which represent inside contour of that circle will be grouped into one sub-tree, and the contour 349D and 349E which represent the outer and inner outlines of that symbols "R" are grouped into another subtree. It turns out that each of these two level subtrees corresponds to a glyph element, that is, to an unconnected solid shape.

Once the contour tree has been separated into sub-trees corresponding to glyph elements, step 464 performs steps 466, 468, 470, 472, 474, 476, and 478 for each such glyph element.

Step for 466 standardizes the direction of the contour. That is, it checks to see if the sequence of outline segments in the top level, or outer, contour in each glyph element has a counter-clockwise direction, and if not it reverses the order of those segments to have such a counterclockwise direction. Similarly, it check to see if the segments of the second level, or inner, contours of the glyph have a clockwise direction, and if not it orders them to have that direction. This has the advantage of having the inner and outer contours of all glyph elements have the same direction, respectively, regardless of the direction in which those contours were delivered to the CSR.

Step 468 picks a standard start point for each contour. Because each contour is closed, the start point is arbitrary. However, in order to facilitate glyph matching and to optimize playback performance, the start point for each contour is picked based on a few simple rules. For outer contours, the start point is chosen to be the lowest point in the contour. If there are several equally lowest points, the rightmost one is chosen. For inner contours, the start point is chosen to be the highest point in the contour. If there are several equally highest points, the rightmost one is chosen. The indexes of both possible start points is already set in the contour data structure during character shape processing. Picking the appropriate point is therefore simply a case of picking one of two indexes based on the desired direction of the contour.

Step 470 builds edge and stroke lists. Edge lists are lists of all horizontal and vertical edges of any significance, including horizontal and vertical tangents, in the shape. Strokes are pairs of such edges which represent the opposing sides of a given horizontal or vertical feature in the shape. These values are used in hinting.

Step 472 generates a glyph record 482 and glyph program string ("GPS") 484, as shown in FIG. 10, for the glyph element. The glyph program string represents the sequence of outline segments in each of the glyph element's associated contours after those sequences have been standardized in steps 466 and 468 in the order in of those contours in the glyph element's associated sub-tree 355. It can be seen that the shape description is independent of any aspects of sequence of outline segments received from ExecChar() for the glyph's shape which are not mandated by that shape itself. This GPS is added to the end of a sequence of GPSs in the GPS memory. Its location and size in this memory is indicated by glyphProgramStfingOffset 454 and glyph-ProgStringSize 452, respectively, in the Glyph record. The glyph record also calculates a glyph signature 456. The signature is a compact byte string that has a high probability of uniquely identifying a glyph. This identification is independent of position and scale factor. It includes the glyph's number of contours, the number horizontal and vertical edges calculated in step 470, the relative size of the right most stroke calculated, the relative position of the left edge of rightmost stroke, the relative size of the topmost stoke, the relative position of lower edge of topmost stroke, the number of outside corners in outside contour, the number of inside corners in outside contour, the number of outside corners in inside contours, and the number of inside corners in inside contours. In this signature the positions and sizes are all relative to the glyph's bounding box, so that glyphs of the same shape, but different size, will have the same signature.

Figure 19:
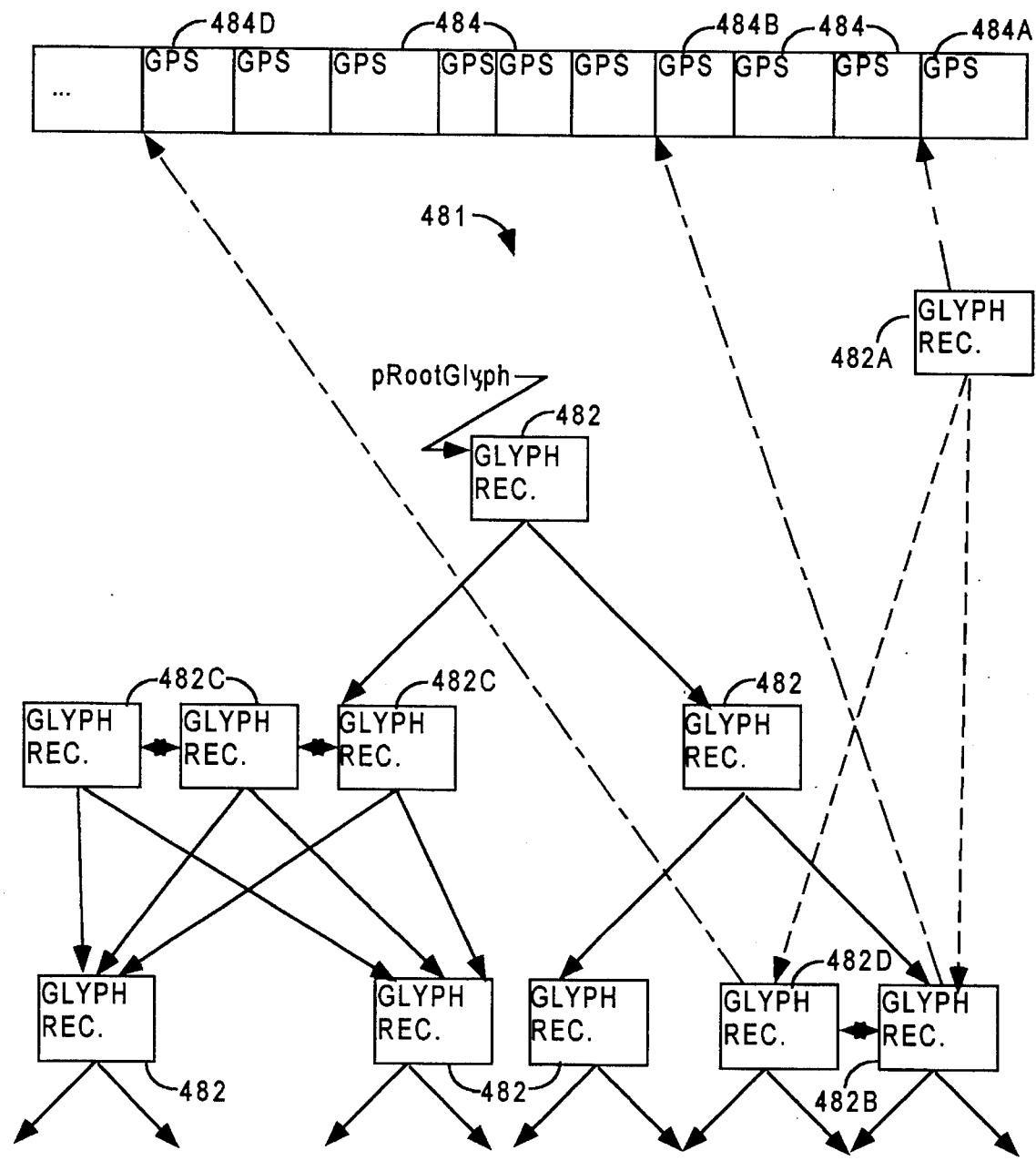
FIG. 19 is a schematic diagram of the binary tree of glyph records, of the type shown in FIG. 10, produced by the character shape recorder of FIGS. 4 and 6, and of the matching which is performed by that recorder for each new glyph records to see if the shape represented by its associated glyph program string ("GPS") matches that of the glyph programming string associated with any glyph record already in the tree.

Once a new glyph record 482 and its associated new GPS 484A have been created, step 474 searches a binary tree 481, shown in FIG. 19, of all the glyph records 482 made for previously recorded glyph shapes. It searches this tree for a glyph record having the same signature. This tree is organized into a binary tree by the numerical value comprised of the collective bytes in each glyph record's signature. This is done to facilitate rapid searching for matching glyph shapes. In each glyph record in the tree, the pointer pNextDown 482 points to the descending branch of the tree whose glyph records have signatures with a lower value. The pointer pNextUp 484 to the descending branch whose corresponding glyph values have higher signature values. And the pointer pNextEqual 486 points to the glyph records, if any, which have the same signature value. A group of glyph records 482C, having equal signature values is shown in FIG. 19.

If the search finds a glyph record 482B, as shown in FIG. 19, having the same signature as a new glyph record 482A, step 476 performs steps 488 and 490. Step 488 compares the sequence of points in the GPS 484B pointed to by the glyph record 482B having the same signature as the new glyph record 482A with the points in the new glyph record's associated GPS 484A. Before this match is done the bounding boxes of the two glyph shapes are normalized to the same size, so the match will be scale independent. This enables the shape of the "R" in "®" to match that in "R", and the shape of the "1" in "½" to match that in "1". In the example shown, is it assumed the points in the GPS 484B associated with glyph record 482B do not match those of the new glyph record's GPS 484A.

If there are a group of sibling glyph records in the glyph tree whose signature matches that of the new glyph record 482A, then the new glyph record's associated GPS 484A is compared against the GPS's of each of those sibling glyph records. In the example of FIG. 19, this means GPS 484A is also compared against the GPS 484D, associated with the glyph record 482D. In the example, it is assumed these two GPSs match.

The ability to make such a match rapidly is greatly facilitated by the fact that the order of contours, the direction of contours, and the start point of contours in each GPS are standardized, and independent of the particular manner in which the shape of that glyph was delivered to the CSP by ExecChar(). This means that glyphs with the same shape, whether received from different characters, different fonts, or even different font description languages will almost always have the exact same GPS, allowing for scaling and rounding errors, and thus can be rapidly matched.

If an exact match, allowing for rounding error, is found, as in the case of GPSs 484A and 484D in FIG. 19, step 490 normally deletes the new glyph record's GPS 484A, and points the glyphProgramStringOffset and glyphProgramStringSize values in the new glyph record 482A to the matching GPSs 484D. If the new glyph record's GPS has a different size than the previously recorded matching GPS, scaling information to convert the glyph described in the previously recorded matching GPS to the proper size is associated with the new glyph record. If the size described in the new GPS 484A is enough larger than that described in the previously recorded matching GPS 484D, they will be treated as not matching to prevent an undesirably low resolution description of the glyph's shape from being used for the new glyph record.

Once the test for matching glyph shapes has been completed, step 478 inserts the new glyph record 482A into the glyph record binary tree 481 at the appropriate location, if the glyph's GPS does not match any previously in the tree.

Figure 8:
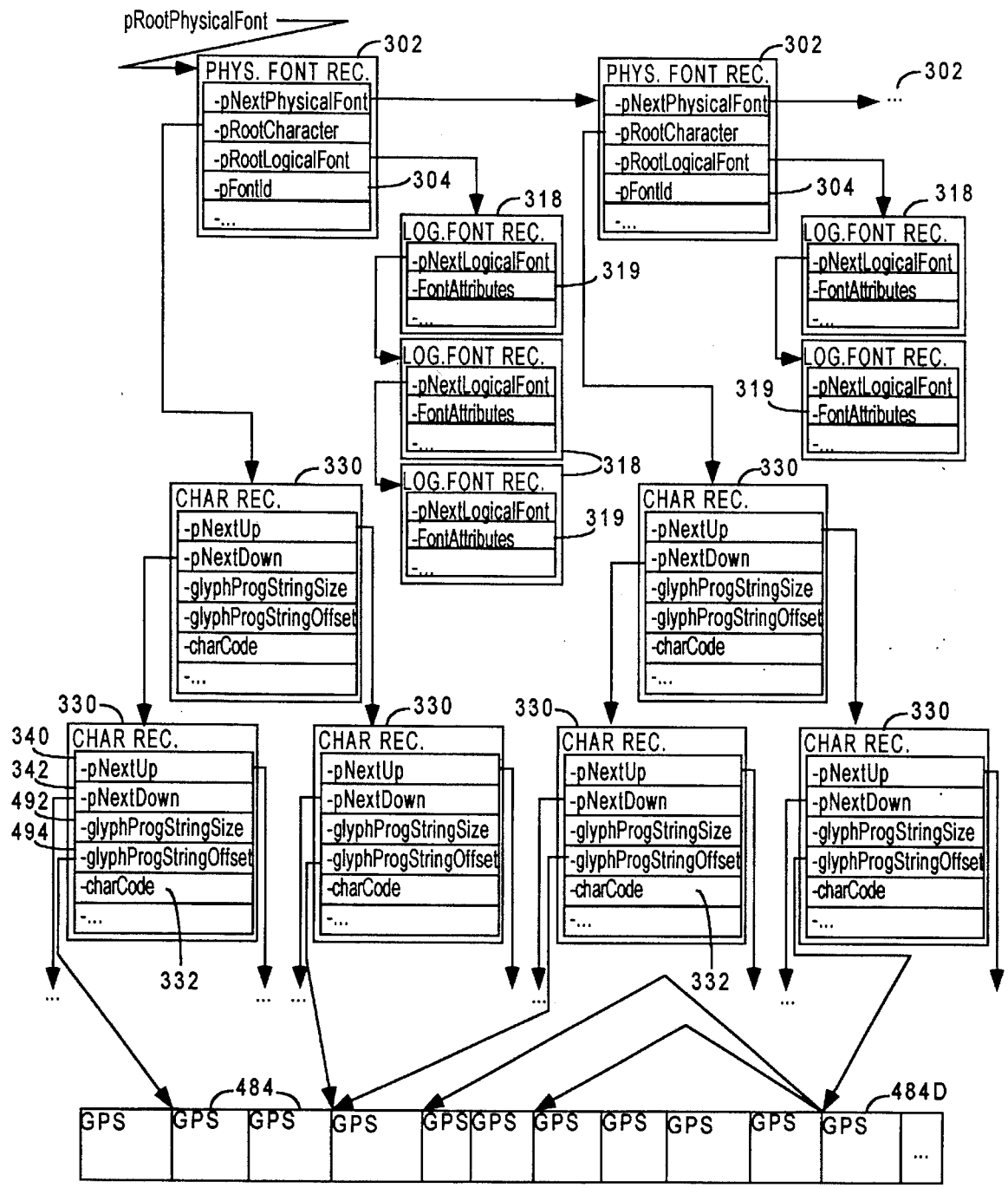
FIG. 8 is a schematic diagram of the list of physical font records created by the character shape recorder of FIG. 4 and 6, of the list of logical font records and the binary tree of character records the recorder can associated with each such physical font record, and of the links which it makes between such character records and the glyph program strings ("GPSs") which contain new descriptions of the shapes of such characters.

After the glyph record tree has been searched for all the glyphs of the character-font shape currently being processed to find if any of those shape can be defined by reference to a common GPS, step 480 points the glyphProgramStringOffset 490 and glyphProgramStringSize 492, shown in FIG. 8, of the character record 330 for the character-font shape being processed to the character's GPS. If the character record's associated shape is formed by scaling, translating, or combining glyphs defined by one or more other GPSs, the GPS pointed to by the character record will be a compound GPS, such as the GPS 484D shown in FIG. 8. Each such compound GPS is contains one or more pointers to such other GPSs, along with any necessary scaling and translating information necessary to define the size and location of each such other GPS's associated glyph in the character record's associated shape Once this is done, step 496 updates the x or y maximum or minimum of the current physical font's bounding box if the x or y maximum or minimum of the bounding box of the character-font shape being processed is more extreme than any such x or y maximum or minimum of any character-font shape previously processed by the font.

At this point the processing of the character-font shape for which CsrDoChar() has currently been called is complete, and CsrDoChar() returns.

Returning now to FIG. 6, when the call to CsrDoChar() 153 in step 236 is complete, step 238 places a code 219A for the character in the text 118 of the portable document, and the program advances to the top of loop 214 to process the next code received from the input text.

If the code received from the input text is a position code 221, the test in step 220 is met, and that step places a corresponding positioning code 221A in the output text, and the program advances to the top of the loop 214.

The input text can include descriptions, or codes, 223 representing the shape of non-character shapes, such as the logo 242 shown on the video display 106 in FIG. 1. In the embodiment shown in FIG. 6 these descriptions are coded in the PostScript page description language, a language which not only describes fonts but also page layout, and non-character shapes.

When a non-character shape code 223 is received in the input text, the test in step 222 is met, and that step acts as if a font code has been received for a font "shape" and it assignes a unique character code for the non-character shape described by that code 223. Step 222 points pfontID to "shape", places standard values in FontAttributes, calls CsrSetFontSpecs(), places the returned FontCode for the "shape" font in the text of the portable document 104. Then step 222 calls CsrDoChar() for the shape's unique charCode to build a font description of its shape, and places the shape's unique charCode 219A in the portable document's text.

During the operation of step 222 when pFontID points to "shape", GetFontInfo() supplies CsrSetFontSpecs with the outline resolution in which the shape will be described to the CSR, GetCharID() returns nulls, indicating that the characters used for hinting are not available in the "shape" font, causing CsrSetFontSpecs() not to call ExecChar, and when CsrDoChar() calls ExecChar(), it returns moves, lines, and curves defined by the PostScript shape description.

Once the loop 214 has processed all of the codes in the input text 116, step 244 calls the CSR's CsrWriteResource function 157. CsrWriteResource() calls WriteResourceData() to actually write this data because such a write depends on the operating system being used. CsrWriteResource() causes the data contained in the physical font records, and their associated logical font and character records, and in the glyph program strings to be compressed and recorded into the portable font resource ("PFR") 126, the major elements of which are shown in FIG. 20. As can be seen from this figure, the PFR includes a logical font directory 500, one or more logical font records 502, one or more physical font records 504, one or more simple glyph program strings, and zero or more compound glyph programs strings 508, that is GPS's such as the GPS 484D shown in FIG. 8 which is defined by reference to one or more other GPSs. The logical font directory 500, includes a look-up table which translates the fontCodes 217A placed in the portable document to be converted into the address and size of that fontCode's corresponding logical font record 502 in the PFR. Each logical font record includes, among other things the FontAttribute values of the logical font and the address and size of its associated physical font record 504 in the PFR. Each such physical font record includes one or more character records 510, each of which includes the address and size of the simple or compound glyph programming string 506 or 508 which actually describes its shape as a sequence of moves, lines, and curves.

Once the call to CsrWriteResource has written the PFR, step 246 calls CsrClose to close the CSR, and the execution of the routine 204 is complete.

The drawing of the input text 116 shown in FIG. 6 is a schematic representation of the initial portion of the fonted text shown on the video monitor 106 in FIG. 1. The drawing of the portable document 104 shown in FIG. 6 is a schematic representation of text 118 representing that same fonted text. As can be seen by comparing these two texts, each font name 217, each character code 219, and each position code 221 in the input text has a corresponding fontCode 217A, charCode 219A, or position code 221A in the portable document, respectively. Furthermore, each non-character shape 233 coded into the input text has a fontCode 217A and a charCode 219A in the portable document.

Figure 21:
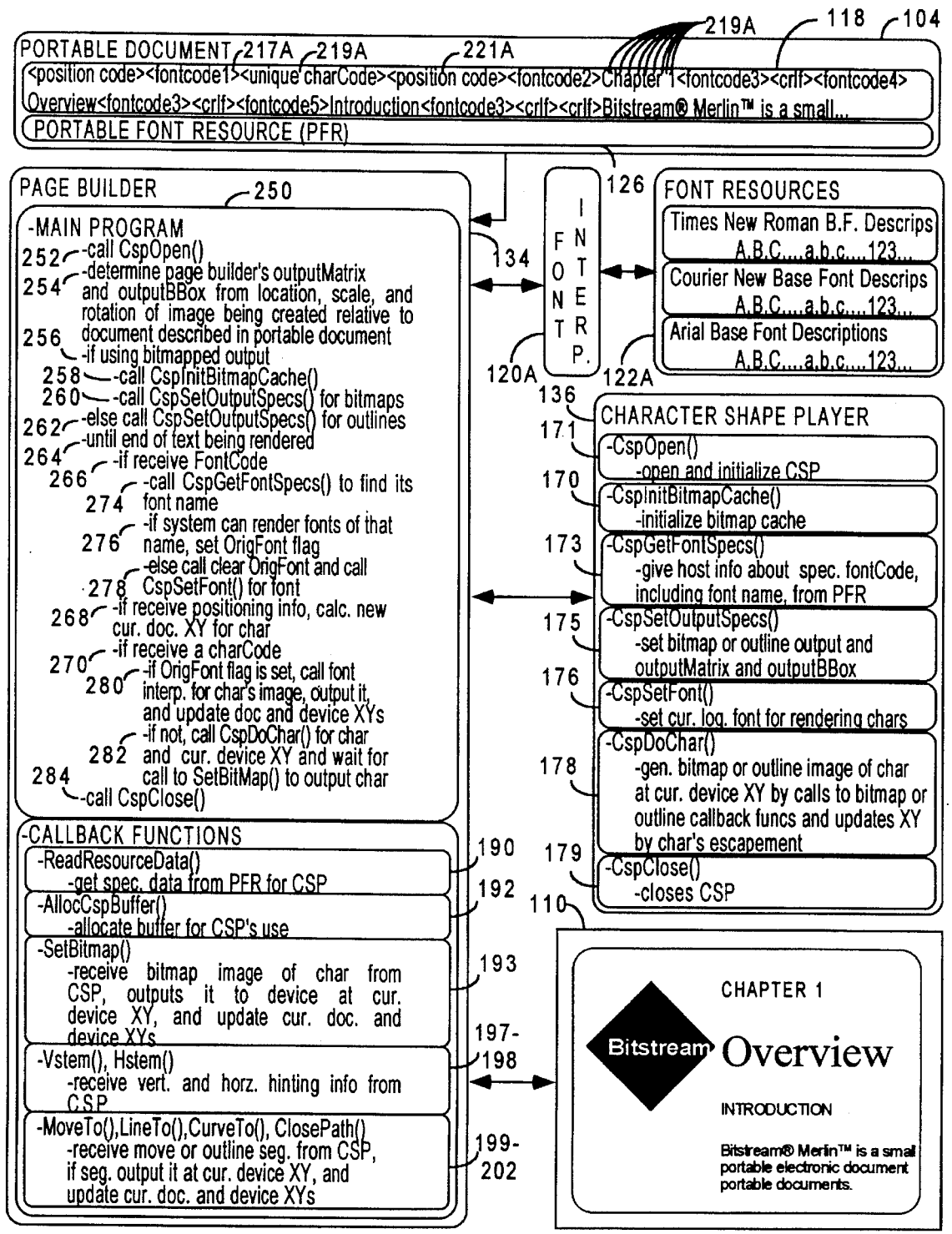
FIG. 21 is a more detailed schematic diagram of the functional elements of the second computer shown in FIG. 1, in which the character shape player of FIG. 5 is used, including the major functional steps performed by the page builder and character shape recorder.

FIG. 21 provides a somewhat more detailed schematic view of the functional elements shown in the second computer 108 in FIG. 1. It shows how the page builder 134 and the modular character shape players 136 interact to render a visual image of the fonted text contained in the portable document 104. It shows an embodiment, in which the second computer includes a font interpreter 120A and font resources 122A, similar in function to the font interpreter 120 and font resources 122 described above with regard the first computer.

The page builder includes a main program 250 and the callback functions 190–202 shown in FIG. 5. Several of those call back functions, which, are not necessary are not shown in FIG. 21.

The first step shown for the page builder's main program is step 252. The calls the character shape player's, or CSP's, CspOpen() function 171. This opens and initializes the CSP data structures.

Once the call to CspOpen() returns, step 254 determines the relationship of the image to be created to the portable document, including the location of the image relative to the document and it size, scale, and rotation relative to the document. It uses these to calculate the outputMatrix and outputBBox for the image. The outputMatrix describes how document coordinates calculated from the portable document are offset, scaled, or slanted relative to the coordinates of the image to be created. The outputBBox defines what locations in document coordinates will not fit into that image, and thus do not need to be generated by the CSP.

Step 256 tests to see if bitmapped or outline output is desired. Bitmapped output is uses for most video displays and laser printers. It represent character shapes with an image comprised of an array of pixels. Outline output is used with plotters and it can be used to generate fonts. It represents images as a sequence of moves, lines, or curves.

If step 256 determines that bitmapped output is desired, steps 258 and 260 are performed. Step 258 calls the CSP's CspInitBitmapCache() function 170. This initializes the bitmap cache which stores a copy of the as many of the character-font shape which have been generated by calls to CspDoChar() as possible, so that when repeated calls are made to CspDoChar() for a given character-font combination, the actual bitmap of that shape will normally only have to be generated for the first of those calls, and upon subsequent calls the bitmap can merely be retrieved from the bitmap cache. After the call to CspInitBitmapCache() returns, step 260 calls the CSP's CspSetOutputSpecs() function 175 to set the CSP to render bitmapped images. If step 256 determines that outline output is to be used, step 262 calls CspSetOutputSpecs() to set the CSP to generate outlines.

In either case the call the CspSetOutputSpecs() also sets the CSP's outputMatrix and outputBBox data structures to reflect those of the page builder. The CSP's outputMatrix determines how the coordinates of the shapes produced by the CSP should be scaled and rotated relative to those contained in the new font descriptions for those shapes. The CSP's outputBBox will cause the CSP to not render shape information which is clearly outside the image being generated.

Once the call to CspSetOutputSpecs() in either step 260 or 262 returns, step 264 performs a loop which sequences though the codes in the text 118 in the portable document, until all of those codes which correspond to information in the image being generated have been processed. This loop is comprised of steps 266, 268, and 270.

If the current code being processed from the text 118 is a FontCode 217A, step 266 causes steps 274, 276 and 278 to be performed.

Step 274 calls the CSP's CspGetFontSpecs() function 173 to get the font name of the font represented by the current fontCode. Once this has been done step 276 checks to see if the second computer's font interpreter 120A and font resources 122A can render images of characters in that font. This requires both that the font interpreter 102A be able to interpret the font description language used for that named font and that a set of pre-defined font descriptions for that named font reside in the font resources 122A. If this test is met, and the font can be rendered by the font interpreter, step 276 sets the OrigFont flag to indicate that the named font's pre-defined, or original, fonts can be used. If the font interpreter cannot render the named font, step 278 clears the OrigFont flag and calls the CSP's CspSetFont() function 176 for the fontCode. This sets the fontCode as the CSP's currently active logical font, and, thus, its associated physical font as the CSP's currently active physical font.

If the current code being processed from the text 118 is a position code 221A, step 268 calculates a new current document position to indicate where the next shape rendered should be placed relative to the current document being imaged.

If the current code being processed from the text 118 is a charCode 219A, step 270 causes substeps 280 and 282 to be performed. Substep 280 tests to see if the OrigFont flag is set, and if so, it calls the computer's font interpreter to get the shape of the current charCode, and it outputs that text at the current device, or image, coordinate, and then it updates the current document and image coordinate to reflect the escapement (normally width) associated with that character's image. If the OrigFont flag is not set, however, the test of substep 282 is met and that step calls the CSP's CspDoChar() function 178 for the character code and current device coordinates. CspDoChar() generates a bitmapped image or outline description of the character at the current device position and updates the page builder's current device position by the escapement of that character. If bitmap output is set, it generates this image by calling the page builder's SetBitmap() callback function 193. CspDoChar() calls this function with pointers to the bitmapped pattern of the character, the size of that pattern, and the current device coordinates. SetBitmap() gets that pattern and actually inserts it in the image buffer. If outline output is set, CspDoChar() calls the page builder's outline-output callback functions. These includes the Vstem() and Hstem() functions 197 and 198 which receive hinting information about the standard vertical and horizontal stroke width of the current font. They also includes the Moveto(), LineTo(), CurveTo(), and ClosePath() functions 199–202 which receive instructions for move, lines, curves, and commands to draw a line to the first point in an outline from CspDoChar() and which actually use those instruction to draw shapes in the image buffer.

Once the loop 264 has processed all the codes in the text 118 which are associated with the image to be created, it will have created that image. At this point it can exit the page builder program or subroutine by calling the CSP's CspClose() function 178, as shown in step 284. This will close all the player's data and memory structures. However, in embodiments in which the page builder is being used to interactively view a document, the program could loop back up to step 254, wait for a new command which changes the location, size, scale, or rotation of the image to be shown, and create a new image as soon as input is received from the user indicating a change in any of those parameters.

It should be understood that the foregoing description and drawings are given merely to explain and illustrate and that the invention is not limited thereto except insofar as the interpretation of the appended claims are so limited. Those skilled in the art who have the disclosure before them will be able to make modifications and variations therein without departing from the scope of the invention.

For example, it should be understood that in some embodiments of the invention which create portable documents, the document building program has the ability to insert new font descriptions into the portable font resource for all the characters in any font which has any one or more characters placed in the portable document. It can do this by calling CsrDoChar() for each character in the character set whenever a call to CsrSetFontSpecs() calls GetFontInfo() and GetFontId(), indicating that the font with which CsrSetFontSpecs is being called is a new physical font. This enables one receiving the portable document to edit the document in all fonts contained in it.

It should also be understood that the invention has uses in many different types of applications.

For example, the invention is very useful with printer controllers and printer drivers, to ensure that a fonted document can be properly printed by a given printer. Where a printer's controller or the computer directly driving it has a page builder and character shape player of the general type described above, the printer is capable of printing any set of fonts sent to it as part of one of the invention's portable documents. Where all the printers on a network have this capability, one could send a portable document to any such printer and be assured that it would be printed correctly with all the desired font shapes.

The invention is of great use with presentation software. Presentation software which includes a page builder and character shape player, can faithfully reproduce the fonts in any presentation which is created as a portable document with an embedded portable font resource. This lets any such presentation be used on any computer having such presentation software, without concern for which fonts are, or are not, present in the computer's associated font resource.

The invention is also of great use in networked applications such as email, groupware, computer bulletin boards, on-line services, and the so-called information superhighway. By using systems, such as are shown in FIG. 3, it allows media containing fonted text and portable font resources to be sent over the network and accurately rendered by any receiving computers containing a page builder and character shape player without concern for what fonts that computer has in its font resources. This is particularly important in applications where fonted text is being received from, and then viewed by, thousands, or millions, of different computers, each with different possible combinations of font resources.

In interactive networked applications, the portable document can be generated interactively. That is, as each successive line or screen is transmitted any new font descriptions required for its characters could be sent with it.

The invention is of great used in electronic publishing, such as the publishing of CD-ROMs, because it assures that any desired fonts used in electronically published documents can be accurately portrayed on virtually any computer without having to worry whether or not its font resources contain each font contained in the published information.

In networked, electronic publishing, and other applications, the actual code for the page builder and character shape player can be sent with the portable document to ensure that each computer receiving the transmission will be able to play it.

The invention is useful in applications for creating and editing font sets. For example, in some embodiments the character shape player is used as part of applications to convert pre-defined font descriptions into new font descriptions which are derived only from the shape information in the pre-defined font descriptions. These new font descriptions can then be installed into a computers font resources. In such applications, software similar to the character shape player is designed to be installed as one of the computer's font interpreters.

The invention is also of great use in multimedia applications. It allows fonted text in such multimedia to be compactly represented by alphanumeric symbols, and to be quickly and accurately reproduced by any computer. In such applications, and in draw and desktop publishing applications, the invention can be modified to handle color, 3-d, transparency, and other graphic effects.

As those skilled in the computer arts will understand, many of the functions described above as being performed in software could be performed in hardware. Similarly, the particular division of functionality into specific functions and modules described above is highly arbitrary and the invention is not limited to such divisions. For example, in some embodiments of the invention the document builder and character shape player can be constructed as a single software module, instead of two. In others, the document builder will not be a separate software module, but rather will be part of a larger host application, such as a word processor, desk top publisher, or presentation program. In others, the character shape recorder and player can be part of one larger module, designed for use in application which both create, view, and edit portable documents.

It should be understood that in other embodiments of the invention's character shape recorder the rules used for extracting new font descriptions from the shape defined in pre-defined font descriptions could be different. For example, in some a given portion of an outline segment in the character shape array between points which have been marked as description-independent points, such as corners, tangents, inflections, or X or Y extreme values could be approximated with multiple curves, instead of a single curve, if the fit reached by only a single curve was less accurate than desired. On others, for example, different standard starting points or contour directions could be used for new font descriptions, or different types of descriptions could be used for representing curved outline segments.

The embodiment of the invention described in detail above is capable of receiving pre-defined font descriptions written in PostScript, TrueType, and Speedo languages. It should be understood that in other embodiments of the invention, the document builder or character shape recorder could be designed to receive pre-defined font descriptions written in other font description languages, such as Intellifont, or new font description languages which might be developed in the future.

For example, the Intellifont language describes curves as circular arcs. This could be accommodated by having the document builder's ExecChar() function convert each circular arc outline segment it receives from an Intellifont font interpreter into a corresponding Bezier curve. It could be accommodated by modifying the character shape recorder itself to have a CsrArcTo() function to receive such an arc and to convert it into a Bezier curve. If, in the future, other font description languages which define outline segments in other ways are developed, the character shape recorder or its associated host software can be changed to accommodate such new descriptive techniques.

In the embodiment of the page builder described above, the page builder tests to see if its computer's font interpreter and font resources can render a given font, and if so, it causes the font to be rendered by the font interpreter. In other embodiments, the page builder renders all characters in the portable document using the character shape player.

In the embodiments of the invention described above, fonted texts have been converted into a single portable document comprised of corresponding output text and a portable font resource. In some embodiments, however, the output text and the portable font resource could be placed in separate files, or perhaps be stored in separate memory locations.

As these examples show, the invention has many possible embodiments, and its scope is not limited to the detailed description provided above or in the attached appendix, but rather is best defined by the claims that follow.

What we claim is:

1. A computerized method comprising the steps of:

receiving an input text which represents a sequence of characters and which identifies for each character a pre-defined font;

accessing, for each combination of a character and pre-defined font so received, a pre-defined font description which describes a sequence of outline segments which define each of the one or more outlines of the shape of the character in its associated pre-defined font using a given font description language;

generating a new font description from the pre-defined font description of the shape for each received character-font combination, which new font description describes the shape of the combination as a sequence of outline segments according to a new font description language, said step of generating new font descriptions including the steps of:

modeling the character-font shape defined by a given pre-defined font description, including the steps of:
   identifying description-independent segmentation points in the one or more outlines represented by the outline segments of the given pre-defined font description, the location of which description-independent points is a function of each such outline's shape, independently of the sequence or segmentation of the outline segments included in the pre-defined font description;

approximating the shape of the outline defined by the pre-defined font description between adjacent description-independent points with new segments bounded at those adjacent description-independent points; and generating a given one of said new font descriptions in which the sequence of outline segments includes said new segments; and creating an output text including:
   a sequence of characters corresponding to those of the input text;
   the new font descriptions created for the characters of the input text, including said given one of said new font description; and
   an indication of which of the new font descriptions represents the shape of each character in the output text.

2. A computerized method as in claim 1 wherein:

said step of receiving an input text includes receiving such a text in which the pre-defined font associated with each of the characters in said text is associated with any one of a plurality of font description languages;

said step of accessing pre-defined font descriptions includes accessing pre-defined font descriptions written in any one of said plurality of font description languages; and said step of generating new font descriptions from the pre-defined font descriptions includes interpreting pre-defined font descriptions from any one of said plurality of font description languages into said new font descriptions.

3. A computerized method as in claim 2 wherein:

said step of generating new font descriptions includes interpreting said pre-defined font descriptions from different font description languages into new font descriptions written in a single new font description language.

4. A computerized method as in claim 1:

further including the step of responding to each different pre-defined font identified in said input text, by creating a corresponding new font;

wherein said step of generating new font descriptions for each pre-defined description of a character-font shape includes associating the new font description created for each such shape with the new font corresponding to the shape's corresponding pre-defined font.

5. A computerized method as in claim 4:

wherein said step of receiving an input text includes receiving an input text in which one or more of the identified pre-defined fonts are pre-defined logical fonts, each of which identifies:

an associated pre-defined physical font which has associated pre-defined physical font descriptions defining the basic shape of each of the pre-defined logical font's characters as a sequence of outline segments; and a set of pre-defined transformations which specify how to transform the basic character shape specified by the pre-defined physical font for any such character into the pre-defined logical font's shape for the character;

said step of accessing pre-defined font descriptions includes accessing said pre-defined physical font descriptions;

said step of responding to each different pre-defined font identified in the input text includes responding to each different pre-defined logical font identified by creating a corresponding new logical font and by checking to see if a new physical font has already been created for the pre-defined logical font's associated pre-defined physical font, and if not, for creating such a new physical font; and said step of generating a new font description from the pre-defined description of the shape for each received character-font combination includes performing the following steps when the combination's font is a given pre-defined logical font:

generating a new physical font description describing the sequence of outline segments associated with the basic shape defined by the given pre-defined logical font's associated pre-defined physical font description for the character;

associating said new physical font description with the new physical font created in association with the given pre-defined logical font's associated pre-defined physical font; and storing a set of transformations corresponding to the predefined transformations identified by the given pre-defined logical font in association with the new logical font created in association with the given pre-defined logical font.

6. A computerized method as in claim 4 wherein:

said step of generating new font descriptions further includes associating, with each new font description associated with a given new font, a character code for identifying the character in the given new font whose shape is described by the new font description:

said character code has a data format which is of sufficient complexity to represent more than two hundred and fifty-six different values, enabling more than two hundred and fifty-six different characters to be associated with each new font; and said character codes are used in said output text to represent the sequence of characters corresponding to those of the input text.

7. A computerized method as in claim 6 further including the step of writing said output text onto a removable mass storage media which can be removed from the computing system.

8. A computerized method as in claim 6 further including the steps of making said output text available on-line to remote users.

9. Mass storage media created by a process comprising the steps of:

receiving an input text which represents a sequence of characters and which identifies for each character a pre-defined font;

accessing, for each combination of a character and pre-defined font so received, a pre-defined font description which describes a sequence of outline segments which define each of the one or more outlines of the shape of the character in its associated pre-defined font using a given font description language;

generating a new font description from the pre-defined font description of the shape for each received character-font combination, which new font description describes the shape of the combination as a sequence of outline segments according to a new font description language, said step of generating new font descriptions including the steps of:

modeling the character-font shape defined by a given pre-defined font description, which modeling includes the steps of:

identifying description-independent segmentation points in the one or more outlines represented by the outline segments of the given pre-defined font description, the location of which description-independent points is a function of each such outline's shape, independently of the sequence or segmentation of the outline segments included in the pre-defined font description;

approximating the shape of the outline defined by the pre-defined font description between adjacent description-independent points with new segments bounded at those adjacent description-independent points; and generating a given one of said new font descriptions in which the sequence of outline segments includes said new segment; and creating an output text including:

a sequence of characters corresponding to those of the input text;

the new font descriptions created for the characters of the input text, including said given one of said new font description; and an indication of which of the new font descriptions represents the shape of each character in the output text;

transferring said output text onto said mass storage media.

10. Mass storage media as in claim 9 wherein:

said step of receiving an input text includes receiving such a text in which the pre-defined font associated with each of the characters in said text is associated with any one of a plurality of font description languages;

said step of accessing pre-defined font descriptions includes accessing pre-defined font descriptions written in any one of said plurality of font description languages; and said step of generating new font descriptions from the pre-defined font descriptions includes interpreting said pre-defined font descriptions from said plurality of different font description languages into new font descriptions written in a single new font description language.

11. A computer system comprising:

mechanisms for receiving an input text which represents a sequence of characters and which identifies for each such character a pre-defined font;

mechanisms for accessing, for each combination of a character and pre-defined font so received, a pre-defined font description which represents the sequence of outline segments which define each of the one or more outlines of the shape of the character-font combination:

whereing said mechanisms for generating includes mechanisms for modeling the character-font shape defined by said pre-defined font description, including mechanisms for identifying description-independent segmentation points in the one or more outlines represented by the outline segments of the pre-defined font description, the location of which description-independent points is determined by each such outline's shape, independently of the sequence or segmentation of the outline segments included in the pre-defined font description;

mechanisms for approximating the shape of the outline defined by the pre-defined font description between adjacent description-independent points with new segments bounded at those adjacent description-independent points; and wherein said new font description describes the shape of the character-font combination as a sequence of outline segments which includes said new segments derived by said mechanisms for modeling; and mechanisms for creating an output text including:
a sequence of characters corresponding to those of the input text;
the new font descriptions created for the characters of the input text; and
an indication of which of the new font descriptions represents the shape of each character in the output text.

12. A computer system as in claim 11 wherein said mechanism for identifying description-independent points includes mechanisms for identifying features in the shape of outlines represented by the pre-defined font description and for locating description-independent points in correspondence with such shape features.

13. A computer system as in claim 11 wherein:
said mechanisms for identifying segmentation points include mechanisms for identifying a sufficient number of description-independent segmentation points to enable each of a given character-font shape's outlines to be closely approximated by a sequence of one or more of said new segments, each of which is located between a pair of said description independent points;
said mechanism for approximating the shape of outlines creates one of said new segments between each of said pairs of description-independent points on each of said outlines; and
said mechanism for generating new font descriptions includes mechanisms for generating new font descriptions which describes the character-font shapes as a sequence of said new outline segments.

14. A computing system as in claim 11 further comprising mechanisms for rendering a visual representation of said output text, which mechanisms include:
mechanisms for interpreting the new font description for each character-font combination in the output text to be rendered into a corresponding character-font shape;
mechanisms for identifying the new font description associated with each of a succession of characters represented in the output text; and
mechanisms for rendering the character-font shape described by the new font description identified for each of said succession of characters at a location in said visual representation of text adjacent the location associated with the preceding character in said succession of characters.

15. A computing systems as in claim 14:
which includes a plurality of computers, including a set of one or more first computers and set of one or more second computers;
wherein each of said first computers includes:
said mechanisms for receiving an input text;
said mechanisms for accessing pre-defined font descriptions;
said mechanisms for generating new font descriptions; and
said mechanism for creating an output text;
wherein each of said second computers includes said mechanisms for rendering a visual representation of the output text; and further comprising mechanisms for transferring the output text produced by one of said first computers to one of said second computers.

16. A computer system as in claim 15 wherein said mechanisms for transferring the output text includes a computer network for enabling data signals representing said output text to be transmitted from one of said first computers to one of said second computers.

17. A computer system as in claim 14 wherein said mechanisms for rendering includes a printing device for producing a printed image of said visual representation.

18. A computer system as in claim 11 wherein:
said mechanisms for receiving an input text includes mechanisms for receiving such a text in which the pre-defined font associated with each of the characters in said text can be associated with any one of a plurality of font description languages;
said mechanisms for accessing pre-defined font descriptions includes mechanisms for accessing pre-defined font descriptions written in any one of said plurality of font description languages; and
said mechanisms for generating new font descriptions from the pre-defined font descriptions includes mechanisms for interpreting said pre-defined font descriptions from said plurality of different font description languages into new font descriptions written in a single new font description language.

19. A computer system comprising:
mechanisms for receiving an input text which includes:
a sequence of characters;
an association between each such character and one of a possible plurality of named fonts, each of which named fonts has associated with it a set of original coded font descriptions which describe the shape of each character in the named font as a sequence of outline segment; and
a machine generated font description for each unique combination of a character and named font in said input text, which machine generated font description has been automatically generated to describe substantially the same shape as the shape defined for the character-named-font combination by the named font's associated original font description, but which describes said shape with a different coding and with a sequence of outline segments the segmentation of which is independent from the segmentation used in the original font description;
mechanisms for rendering a visual representation of said input text including:
mechanisms for identifying the named font associated with each successive character in the input text;
mechanisms for determining whether or not the system can render the named font associated with each such successive character from one of the named font's original font descriptions, that is, whether or not the system has access to the such original font description and has mechanisms for interpreting the original font descriptions into a shape;
mechanisms, operating when said means for determining determines the system can render the named font for such character from its corresponding original font description, for interpreting the original font description for the named font to generate the shape for the character;
mechanisms, operating when said means for determining determines the system cannot render the font named for such character from its corresponding original font description, for interpreting the machine generated font description for such character and its associated named font to generate the shape for the character;

mechanisms for rendering the shape generated for each such successive character in the visual representation at a location adjacent the location associated with the preceding character in the sequence of characters.

20. A computerized method comprising the steps of:

receiving an input text which represents a sequence of characters and which identifies for each character a pre-defined font;

accessing, for each combination of a character and pre-defined font so received, a pre-defined font description which describes a sequence of outline segments which define each of the one or more outlines of the shape of the character in its associated pre-defined font using a given font description language;

responding to each different pre-defined font identified in said input text, by creating a corresponding new font;

generating a new font description from the pre-defined font description of the shape for each received character-font combination, which new font description describes the shape of the combination as a sequence of outline segments according to a new font description language, said generating of new font descriptions including associating the new font description created for each character-font shape with the new font corresponding to the shape's associated pre-defined font;

creating an output text including:
a sequence of characters corresponding to those of the input text;
the new font descriptions created for the characters of the input text, associated with their corresponding new fonts; and
an indication of which of the new font descriptions represents the shape of each character in the output text; and wherein the number of new font descriptions associated with a given new font in the output text varies as a function of the number of characters in the input text identified with the given new font's corresponding pre-defined font.

21. A computerized method comprising the steps of:

receiving an input text which represents a sequence of characters, which identifies for each character a pre-defined font, and in which the pre-defined fonts associated with different characters in said text are associated with different font description languages;

accessing, for each combination of a character and pre-defined font so received, a pre-defined font description which describes a sequence of outline segments which define each of the one or more outlines of the shape of the character in its associated pre-defined font using that pre-defined font's associated one of said different font description languages;

generating a new font description from the pre-defined font description of the shape for each received character-font combination, all of which new font descriptions describe the shape of their respective character-font combination as a sequence of outline segments described in a common, new font description language;

creating an output text including:
a sequence of characters corresponding to those of the input text;
the new font descriptions created for the characters of the input text; and
an indication of which of the new font descriptions represents the shape of each character in the output text.

22. A computerized method comprising the steps of:

receiving an input text which represents a sequence of characters and which identifies for each character a pre-defined font;

accessing, for each combination of a character and pre-defined font so received, a pre-defined font description which describes a sequence of outline segments which define each of the one or more outlines of the shape of the character in its associated pre-defined font using a given font description language;

generating a new font description from the pre-defined font description of the shape for each received character-font combination, which new font description describes the shape of the combination as a sequence of outline segments according to a new font description language;

creating an output text including:
a sequence of characters corresponding to those of the input text;
the new font descriptions created for the characters of the input text;
an indication of which of the new font descriptions represents the shape of each character in the output text; and a computer program including instructions for rendering a visual representation of said output text.

23. A computerized method comprising the steps of:

receiving an input text which represents a sequence of characters and which identifies for each character a pre-defined font;

accessing, for each combination of a character and pre-defined font so received, a pre-defined font description that describes a sequence of outline segments which define each of the one or more outlines of the shape of the character in its associated pre-defined font using a given font description language;

generating a new font description from the pre-defined font description of the shape for each received character-font combination, which new font description describes the shape of the combination as a sequence of outline segments according to a new font description language;

creating an output text including:
a sequence of characters corresponding to those of the input text;
the new font descriptions created for the characters of the input text; and
an indication of which of the new font descriptions represents the shape of each character in the output text;

receiving requests over a communications network from one or more remote computing systems for the transmission of different selected portions of said output text; and responding to each such request by transmitting the following over the network to a remote computing system:
the part of the output text's sequence of characters corresponding to the portion of text selected by the request;

an indication of which of the new font descriptions represents the shape of each character in the selected portion of text; and a subset of said new font descriptions necessary to describe the character-font shape of the transmitted characters.

24. A computerized method as in claim 23 wherein said step of responding to each request includes:

recording which new font descriptions have previously been sent to a given remote computing system; and determining whether or not to send a given new font description in response to a request from a given remote computing system as a function of whether or not said recording indicates said given new font description has previously been sent to the given remote computing system.

* * * * *